US011757382B2

(12) United States Patent
Mores et al.

(10) Patent No.: US 11,757,382 B2
(45) Date of Patent: Sep. 12, 2023

(54) MOTOR CONTROL SYSTEM, METHOD OF OPERATING A MOTOR CONTROL SYSTEM AND AIRCRAFT

(71) Applicant: Volocopter GmbH, Bruchsal (DE)

(72) Inventors: Sebastian Mores, Munich (DE); Benjamin Kirsch, Heidelberg (DE)

(73) Assignee: Volocopter GmbH, Bruchsal (DE)

( * ) Notice: Subject to any disclaimer, the term of this patent is extended or adjusted under 35 U.S.C. 154(b) by 275 days.

(21) Appl. No.: 17/086,961

(22) Filed: Nov. 2, 2020

(65) Prior Publication Data
US 2021/0194394 A1 Jun. 24, 2021

(30) Foreign Application Priority Data
Dec. 20, 2019 (EP) .................................. 19218764

(51) Int. Cl.
| | |
|---|---|
| *H02P 5/46* | (2006.01) |
| *B64D 27/24* | (2006.01) |
| *H02P 29/024* | (2016.01) |
| *B64D 45/00* | (2006.01) |
| *B64U 30/20* | (2023.01) |

(52) U.S. Cl.
CPC ................ *H02P 5/46* (2013.01); *B64D 27/24* (2013.01); *H02P 29/024* (2013.01); *B60L 2200/10* (2013.01); *B60L 2220/42* (2013.01); *B64D 2045/0085* (2013.01); *B64U 30/20* (2023.01)

(58) Field of Classification Search
CPC ....... H02P 5/46; H02P 29/024; B60L 2200/10
See application file for complete search history.

(56) References Cited

U.S. PATENT DOCUMENTS

| | | | |
|---|---|---|---|
| 9,081,372 B2 | 7/2015 | Fervel et al. | |
| 9,828,107 B1* | 11/2017 | Ruymgaart | .......... G05D 1/0077 |
| 10,023,318 B2* | 7/2018 | Kobayashi | ................ H02P 5/46 |

(Continued)

FOREIGN PATENT DOCUMENTS

| | | |
|---|---|---|
| WO | 2016193884 | 12/2016 |
| WO | 2019139737 | 7/2019 |

OTHER PUBLICATIONS

Sghairi, M. et al., "Challenges in Building 1-18 Fault-Tolerant Flight Control System for a Civil Aircraft", IAENG International Journal of Computer Science, 35:4, 5 pages, Nov. 20, 2008.

*Primary Examiner* — Kawing Chan
(74) *Attorney, Agent, or Firm* — Volpe Koenig

(57) ABSTRACT

A motor control system (1), preferably for an aircraft, having a plurality of motors (3), each having a motor control unit (2) that includes a primary motor controller (COM) configured to provide motor control commands (9) to a corresponding motor (3). The system (1) also has a system control unit (COMstring) in communication with each of the primary motor controllers (COM), configured to provide motor control commands (9) to the primary motor controllers. A system monitoring unit (MONstring) is connected to the system control unit for monitoring an operation thereof, and at least one sensor (4) determines an operation state of at least one of the motors. The sensor is connected with the system monitoring unit, which is configured to disable communication between the system control unit and the primary motor controllers and/or between the primary motor controllers and the motors based on the monitoring and/or the determined operation state.

17 Claims, 17 Drawing Sheets

(56) References Cited

U.S. PATENT DOCUMENTS

| | | | |
|---|---|---|---|
| 2005/0065662 A1* | 3/2005 | Reindle | A47L 9/2889 |
| | | | 701/1 |
| 2017/0084181 A1* | 3/2017 | Wilson | G08G 5/0056 |
| 2018/0072430 A1* | 3/2018 | Misfeldt | G05D 1/0072 |
| 2018/0278146 A1* | 9/2018 | Guven | E21B 41/0085 |

* cited by examiner

MOTOR CONTROL SYSTEM, METHOD OF OPERATING A MOTOR CONTROL SYSTEM AND AIRCRAFT

INCORPORATION BY REFERENCE

The following documents are incorporated herein by reference as if fully set forth: European Patent Application No. 19218764.9, filed Dec. 20, 2019.

TECHNICAL FIELD

The present invention relates to a motor control system, preferably for an aircraft, most preferably for a passenger and/or load carrying multi-rotor aircraft with a plurality of motors.

Additionally, the present invention relates to a method of operating a motor control system, to an aircraft, to a use of a motor control system and to a use of a method of operating a motor control system.

Said plurality of motors are preferably devised as electric motors, but could also be thermal engines, such as combustion engines, pneumatic motors or other motors known to the skilled person.

BACKGROUND

Generally, for flight operations and applications a so-called airworthiness of an aircraft is crucial. Airworthiness is the measure of the aircraft's suitability for safe flight. Airworthiness also comprises an overall status of the aircraft, its motor(s), its motor control system, of a (plurality of) lift generating unit(s), such as (a) rotor(s), or of other parts of the aircraft depending to its construction, design and on defined conditions for safe operation.

Known airworthy aircraft, such as the one described DE 11 2015 003 310 T5, for instance, employ a plurality of motors. Each of said motors has a motor control unit for controlling a corresponding motor. Said motor control units are being devised for providing motor control commands to a corresponding motor, wherein the term "providing motor control commands" also includes processing and transmitting the motor control commands. Said motor control commands are for example controlling the amount of energy supplied to the motor. Said motors are employed to drive a rotor of the aircraft.

However, in case one of or a plurality of said motor control unit(s) should malfunction or even fail completely, the motor corresponding to said malfunctioning motor control unit(s) cannot be reliably controlled, potentially leading to an aircraft crash in the worst case. A malfunctioning motor control unit can for instance cause overheating of the motor if too much energy is supplied to the motor, leading in the worst case to a disintegration of said motor. Moreover, a malfunctioning motor control unit can cause unstable and/or discontinuous energy supply to the motor, potentially leading to unstable and/or discontinuous rotor drive and/or damage other motors or structural parts. Moreover, a malfunctioning motor control unit might cause motor failure if too little or even no energy is supplied to the motor.

The term "malfunction" describes a state of operation in which an element, a means, a unit or a system does not function correctly and normally. The term "failure" describes a state in which operation is not possible anymore, thus "failure" and "complete failure" is also comprised by "malfunction". Malfunction and failure can affect hardware and/or software. The loss of control over the motor control unit and the motor corresponding to said motor control unit is a particular risk for the airworthiness of any aircraft.

SUMMARY

Therefore, the objective of the current invention is to provide a motor control system which enables a safer way of controlling a corresponding motor and preferably enhances operational flight safety and airworthiness of the aircraft. Yet another objective of the present invention is to provide an aircraft with a high operational flight safety.

These objectives are met, according to the invention, by a motor control system, a method for operating a motor control system, an aircraft, the use of a motor control system, and the use of a method of operating a motor control system having and/or using one or more of the features descried herein. Preferred embodiments are defined below and in the claims.

According to the invention, a motor control system, preferably for an aircraft, most preferably for a passenger and/or load-carrying multi-rotor aircraft, comprises a plurality of motors, preferably electric motors. Each of said motors has a motor control unit for controlling a corresponding motor. The motor control units comprise a primary motor controller being devised for providing motor control commands to said corresponding motor. The motor control system further comprises a system control unit in communication connection with each of said plurality of primary motor controllers. The system control unit is being devised for providing multi control commands to said primary motor controllers. Additionally, the motor control system comprises a system monitoring unit in connection with said system control unit for monitoring an operation state thereof and at least one sensor for determining an operation state of at least one of said plurality of motors. Said sensor(s) is(are) in operative connection with said system monitoring unit and are preferably devised as optical sensor, acoustic sensor, capacitive sensor, temperature sensor, vibrational and/or rotational sensor, torque sensor, acceleration sensor, angular rate sensor, magnetometer, current sensor, pressure sensor, or combinations thereof. The system monitoring unit is devised to disable communication between said system control unit and said primary motor controllers and/or between said primary motor controllers and said motors based on an outcome of said monitoring and/or of said determining.

For instance, a system monitoring unit recognizes a malfunction or a (complete) failure of the system control unit by said monitoring. In this case, the system monitoring unit disables said communication. Advantageously, the sensor determines a malfunction or (complete) failure of at least one of said plurality of motors and communicates this malfunction by means of a malfunction signal to the system monitoring unit which then disables said communication.

In this way safety is enhanced, because in case of a malfunction or a (complete) failure the corresponding motor can be safely shut down or disengaged and will therefore not cause complications or interference with the other normal functioning motors. Complications could occur if an already malfunctioning motor is continuously supplied with motor control commands, potentially causing instable operation of said motor. In this way, the motor control system is robust against random failures and common-mode failure and thus safe. A common mode failure is a malfunction such as an error, which affects a number of elements otherwise considered independent. A common-mode error might also cause multiple other malfunctions, such as failure of elements, means or systems. Especially identical systems are susceptible to common modes.

In a first embodiment, each of said motor control units preferably comprises a primary switch. The primary switch can be located between said primary motor controller and the corresponding motor.

In another embodiment, the system monitoring unit can be in operative connection with each of said primary switches for controlling a switching state of the primary switches and preferably changes the switching state of the primary switches in case of a detected and/or monitored malfunction.

By changing the switching state of the primary switches the system monitoring unit can advantageously disable communication between the primary motor controller and the corresponding motor in case of a malfunction or failure in an easy way, thus further enhancing safety of the motor control system.

In the course of another embodiment the primary motor controller of one motor control unit is preferably in connection with said primary switch of another motor control unit for controlling a switching state thereof.

This embodiment is particularly advantageous, because the primary motor controller of one unit can disable communication of a primary motor controller of another motor control unit with a motor corresponding to said primary motor controller of the other motor control unit, in case of a malfunction or failure. This additional way of disabling communication by changing switching states of the primary switches is particularly fast compared to the aforementioned switching of the primary switches via the system monitoring unit, thus further enhancing overall safety.

For example, such malfunction or failure could occur in the primary motor controller of said one motor control unit or in the primary motor controller of said other motor control unit. Preferably, the primary motor controller of one motor control unit and the primary motor controller of another motor control unit are in communication connection, and more preferably are devised for monitoring a function state of each other. In this way, even if the system monitoring unit malfunctions such that the switching state of the primary switches cannot be controlled anymore, the primary motor controllers can control said switching state, thus ensuring safe operation.

In the course of an especially advantageous embodiment, each of said motor control units comprises a secondary motor controller, which secondary motor controller can be devised for providing motor control commands to a corresponding motor.

Furthermore and in consequence, the motor control system is single fault tolerant, which means that a single fault condition, wherein one means for protection against a malfunction is defective, do not cause malfunction or failure of the whole motor control system, because the motor control system includes redundancies for ensuring operability in case of malfunctions. In other words, the secondary motor controllers can serve as a fallback position for controlling the corresponding motor in case one or multiple primary motor controllers malfunction.

In another embodiment, a secondary switch is advantageously located between each secondary motor controller and the corresponding motor. Preferably, said system monitoring unit is in connection with each of the secondary switches for controlling a switching state thereof. By changing the switching state of the secondary switches the system monitoring unit can advantageously enable communication between the secondary motor controller and the corresponding motor in case of a malfunction or failure in an easy way, thus further enhancing safety of the motor control system.

Advantageously, in another embodiment, the primary switch is initially in a closed switching state and the secondary switch is initially in an open switching state. An initially open switching state does not allow the transmission of motor control commands. However, switching the initially open switching state to a closed state allows transmission of motor control commands, for example by causing the contacts of a given switch to close and to allow electric current flow and/or by enabling optical data transmission.

In the initially closed switching state, motor control commands are transmitted for example via the flow of an electric current. Switching said initially closed state (to an open state) will disable the transmission of said motor control commands, for example by opening an electrical contact which will not allow any electric current flow.

An initially open or a closed switching state can be switched to a closed or open state, respectively, depending on corresponding signal inputs to said switches, for example by means of said malfunction signal. This may be the case, if the system monitoring unit monitors a malfunction. For achieving even higher safety, the switches can receive two signals simultaneously, for example a signal generated by the system monitoring unit and a signal generated by a primary motor controller. Advantageously, even if one of the two signal provides the input "change switching state", while the other signal provides the input "do not change switching state", the switch may change their respective switching states accordingly.

According to an embodiment, the secondary motor controllers are preferably in a stand-by state, more preferably in a so-called 'hot stand-by' state, wherein the secondary motor controllers receive the same motor control commands as the primary motor controllers, but do not communicate said motor control commands to the corresponding motors. Then, after switching the secondary switches to a closed state, the motor control commands are communicated to the corresponding motors. Due to the 'hot stand-by' state the delay time, during which the motor might not receive motor control commands after the aforementioned switching, is particularly short, thus increasing operational safety.

In another embodiment, each one of the primary switches is connected via one of a plurality of inhibitors to the system monitoring unit. Additionally, the primary switch of one motor control unit is connected via an inhibitor to the primary motor controller of another motor control unit. Said inhibitors can be devised to change the initially closed switching state of said primary switches to an open state in case a malfunction signal is received. Said inhibitor can be, for example, a logic operator, preferably a Boolean operator, most preferably an OR element with input negation.

In another embodiment, each one of the secondary switches is connected via one of a plurality of enablers to the system monitoring unit. Additionally, the secondary switch of one motor control unit is connected via an enabler to the primary motor controller of another motor control unit. Said enabler can be devised to change the initially open switching state of said secondary switch to a closed state in case a malfunction signal is received. Advantageously the control switch is connected via an enabler to the system monitoring unit. Said enabler can be, for example, a logic operator, preferably a Boolean operator, most preferably a OR element.

The inhibitors and enablers are particularly robust against malfunction and simple in use, therefore enhancing the overall operational safety.

In yet another embodiment, said system monitoring unit is particularly devised for enabling communication between said secondary motor controllers and said motors based on an outcome of said monitoring and/or of said determining. This embodiment advantageously increases safety by increasing variability, because the system monitoring unit can change the switching states of the aforementioned primary switches, secondary switches and the control switch based on said monitoring, performed by said sensor(s).

Preferably, the system monitoring unit is devised for simultaneously changing the switching state of the primary switches and of the secondary switches. After changing the switching state of the primary switches and of the secondary switches, the motor control commands are no longer transmitted from the primary motor controllers to the corresponding motors, but instead from the secondary motor controllers to the corresponding motors.

Simultaneous switching of switching states enables a safe operation of the motor control system, because in case of a malfunction or failure of a primary motor controller or a plurality of primary motor controllers, the transmission of the motor control commands to the corresponding motors is instantly changed from the primary motor controllers to the secondary motor controllers, and vice versa, thus ensuring the transmission of the motor control commands to the corresponding motors without delay enhancing the overall safety.

In another embodiment a secondary system control unit can be in communication connection with each of said plurality of secondary motor controllers. Said secondary system control unit is preferably devised for providing motor control commands to said secondary motor controllers. More preferably, said secondary system monitoring unit is in connection with said secondary system control unit for monitoring an operation thereof. Advantageously, this embodiment enhances overall safety of the motor control system, because the secondary system control unit enables a uniform distribution of the motor control commands to each secondary motor controller, thus minimizing potential errors.

Advantageously, in another preferred embodiment the system monitoring unit is devised to monitor the operation states and recognize possible malfunctions of at least one of:
- the system control unit, for example if the system control unit provides erroneous or faulty motor control signals to the primary motor controllers;
- the primary motor controllers, for example if at least one of the primary motor controllers does not follow the motor control commands provided by the system control unit;
- the secondary system control unit;
- the secondary motor controllers, for example detect that at least one secondary motor controller provides erroneous or faulty motor control signals to the corresponding motor.

This embodiment advantageously increases safety by increasing the number of monitored elements and monitored operation states, allowing a quick and improved response to malfunctions.

The primary motor controllers, the secondary motor controllers, the system control unit, the system monitoring unit and the secondary system control unit are preferably devised as microcontrollers, integrated circuits, central processing units, multi-core processors, digital signal processors, microcontrollers, FPGAs (field programmable gate arrays), digital controllers, analog processors, analog computers, analog controllers, such as PID controllers, or as hybrid processing units made from both analog and digital elements. The aforementioned elements allow robust, manifold, simple and safe operation. Moreover, in case one of the aforementioned elements fails or malfunctions, it can be replaced easily.

In an especially advantageous embodiment, at least one flight control channel can be in connection with said system control unit, said system monitoring unit and said secondary system control unit for providing motor control commands. The flight control channel can be a communication channel, for example a physical transmission medium such as a wire, or a logical connection over a multiplexed medium such as a radio channel. Moreover, optical data transmission can also be used for transmitting motor control commands. The flight control channel is preferably used to convey motor control commands, for example a digital bit stream, from one or several senders for example a pilot.

Advantageously, the flight control channel ensures that the aforementioned units (system control unit, system monitoring unit and secondary system control unit) all receive identical motor control commands. This preferably enables the system monitoring unit to receive and process the motor control commands independently from the system control unit and the secondary system control unit for monitoring of the system control unit and/or of the secondary system control unit, thus increasing overall safety.

Preferably, the secondary system control unit is also in stand-by state, preferable a 'hot stand-by' state, receiving the same motor control commands as the primary system control unit. The advantages of the 'hot stand-by' state were already previously mentioned and include minimal delay times, during which the motor might not receive motor control commands after switching from the primary motor controllers to the secondary motor controllers. However, it is also possible that the stand-by state is one of a so-called warm stand-by or a cold stand-by, which is chosen by a person skilled in the art respectively.

In a different embodiment the primary motor controllers comprise a first set or type of hardware and/or software, and the secondary motor controllers comprise a second set (or type) of hardware and/or software. The term "set" also describes different types, models or versions. Preferably, the first set of hardware and/or software is different from the second set of hardware and/or software. Most preferably, the primary motor controllers and the secondary motor controllers are managed by different operating systems and/or schedulers.

The aforementioned embodiment has the advantage of providing a motor control system that is safer against physical hardware damage, such as malfunction or failures, caused, e.g. by temperature differences, humidity, voltage fluctuations or other external influences. Preferably, the different sets (or types) of hardware can be selected in a way such that it is unlikely that the aforementioned physical events damage both hardware sets. For example, the first set of hardware can be devised for operating at medium and low temperatures, and the second set of hardware is devised for operating at medium and high temperatures. The same applies to any software running on said hardware.

In case the system control unit and the secondary system control unit are managed by different sets or types of software, preferably by different operating systems and/or schedulers, operational safety is enhanced, because it is less likely that both sets of software are simultaneously damaged by an error, a malware or a virus, and/or a malfunctioning software update or other software-related errors, compared to identical sets of software.

In another preferred embodiment the system control unit comprises a first set or type of hardware and/or software and the secondary system control unit comprises a second set of hardware and/or software, preferably different sets of hardware and/or software. Most preferably, the system control unit and the secondary system control unit are managed by different operating systems.

In another advantageous embodiment, the first set of hardware and/or software of the primary motor controllers can be different to the first set of hardware and/or software of the system control unit. Preferably, the second set of hardware and/or software of the secondary motor controllers can be different to the second set of hardware and/or software of the secondary system control unit. The aforementioned embodiment increases safety by increasing variability and further shows the advantages mentioned for different sets of hardware and software before.

However, in another embodiment, the first set of hardware of the system control unit and the first set of hardware of the primary motor controllers can be identical, and the second set of hardware and/or software of the secondary system control unit and the secondary motor controllers can be identical. This embodiment overcomes compatibility issues of the corresponding sets of hardware and/or software and can therefore also lead to an enhancement of safety of the motor control system.

In another embodiment the system control unit and the primary motor controller can be operated on the same set of hardware, preferably as a single partition controlled by the operating system. In another embodiment the secondary system control unit and the secondary motor controller can be operated on the same set of hardware, preferably as a single partition controlled by the operating system. These embodiments have the advantage of saving resources, because multiple functions can be performed by the same set of hardware, preferably the same partition.

In another advantageous embodiment each one of the primary motor controllers and/or the secondary motor controllers extracts a command string from said motor control commands. The command string contains relevant information for the one particular primary motor controller or secondary motor controller SEC for controlling said corresponding motor. This embodiment has the advantage that distinct primary motor controllers and/or distinct secondary motor controllers can be controlled independently from the other primary motor controllers and/or the other secondary motor controllers. In this way a motor corresponding to said distinct primary motor controller and/or said distinct secondary motor controller can be controlled independently from the other motors, allowing independent control and operation of each motor. Additionally, it is possible to activate/deactivate a distinct primary motor controller and/or a distinct secondary motor controller, and vice versa.

According to another aspect of the invention, a method of operating a motor control system is provided. The method comprises the step of providing a primary motor controller, a secondary motor controller and a corresponding motor; and generating a motor control command. The method also comprises the step of transmitting of said motor control command from said primary motor controller to said corresponding motor. Furthermore, the method also comprises determining an operation state of said corresponding motor and/or monitoring an operation state of said primary motor controller. The method also comprises disabling transmitting of said motor control command from said primary motor controller to said corresponding motor and enabling transmitting of said motor control command from said secondary motor controller to said corresponding motor based on said determining and/or monitoring, and vice versa.

The method according to the invention advantageously enables safe operation of a motor control system because in case of a malfunctioning or failure of a primary motor controller the motor control commands can be transmitted via a secondary motor controller to the corresponding motor, ensuring operability of the corresponding motor.

In an embodiment, the method further comprises the step of providing one motor control unit comprising said primary motor controller. In a further step, another motor of another motor control unit corresponding to another primary motor controller and another secondary motor controller of said other motor control unit can be provided. Furthermore, the step of disabling transmission of said motor control command from said primary motor controller of said other motor control unit to said motor via said primary motor controller of said one motor control unit based on said determining and/or monitoring can be comprised. This embodiment can also comprise enabling transmission of said motor control command from said other secondary motor controller of said other motor control unit to said motor via said primary motor controller of said one motor control unit based on said determining and/or monitoring.

An advantage of the aforementioned embodiment is that the operational safety is increased due to a higher variability. Moreover, a faster response in case of a malfunction is achieved, as already mentioned previously.

In another embodiment, the method further comprises providing a system monitoring unit. In another preferred embodiment, the method further comprises disabling transmission of said motor control command from said primary motor controller to said corresponding motor via said system monitoring unit based on said determining and/or monitoring. Preferably, the method further comprises the step of enabling transmission of said motor control command from said secondary motor controller to said corresponding motor via said system monitoring unit based on said determining and/or monitoring. This embodiment increases safety, because the system monitoring unit can advantageously detect malfunctions and also provides the advantages mentioned for the system monitoring unit before.

In a preferred embodiment, the method further comprises providing at least one sensor. In another preferred step, the method further comprises determining said operation state via said sensor(s), and preferably communicating said determining to said monitoring unit and/or the step of monitoring said operation state via said monitoring unit. The sensor(s) preferably provides information about the operational status of at least one of the plurality of motors. This embodiment advantageously increases safety due to an additional measure for detecting malfunctions, as already previously mentioned.

According to another aspect of the invention, there is provided an aircraft, preferably a passenger and/or load carrying multi-rotor aircraft. The aircraft comprises a motor control system, preferably a motor control system as afore described, and at least one lift generating unit. The lift generating unit is preferably mechanically coupled to at least one of said motors and more preferably constructed as a rotor, which can be driven in rotation by said at least one motor. Due to the previously described advantages of the motor control system, the aircraft is particularly safe and airworthy.

In a further embodiment, the aircraft can also comprise a plurality of lift generating units, each connected to a plurality of motors. In case of a malfunction or failure of one lift generating unit the airworthiness of the aircraft is still ensured by the remaining lift generating units which enable safe landing of the aircraft. In case a motor of a lift generating unit malfunctions or fails, the remaining motors can advantageously provide the necessary torque to the lift generating unit, ensuring airworthiness of the aircraft.

In another embodiment, the aircraft comprises a coupling means located between said motor and said lift generating unit. The coupling means are preferably devised as clutches. Preferably, the motor control system is in communication connection with said coupling means. More preferably, the coupling means are devised for connecting or disconnecting at least one of said motors to/from said lift generating unit, based on an outcome of said monitoring and/or of said determining by said motor control system, under operative control by the motor control system, whereas said coupling means is also able to decelerate said lift generating unit.

Thus, the coupling means advantageously enable a simple and effective decoupling of a malfunctioning motor from the lift generating unit, thus enhancing the overall safety of the aircraft.

According to another aspect of the invention a motor control system as described before can be used in an aircraft as previously described.

Furthermore, according to another aspect of the invention, the method of operating a motor control system as previously described, can be employed for operating an aircraft as previously described.

BRIEF DESCRIPTION OF THE DRAWINGS

Additional properties and advantages of the present invention will become apparent from the following description of preferred embodiments with reference to the drawings.

DETAILED DESCRIPTION

Figure 1:
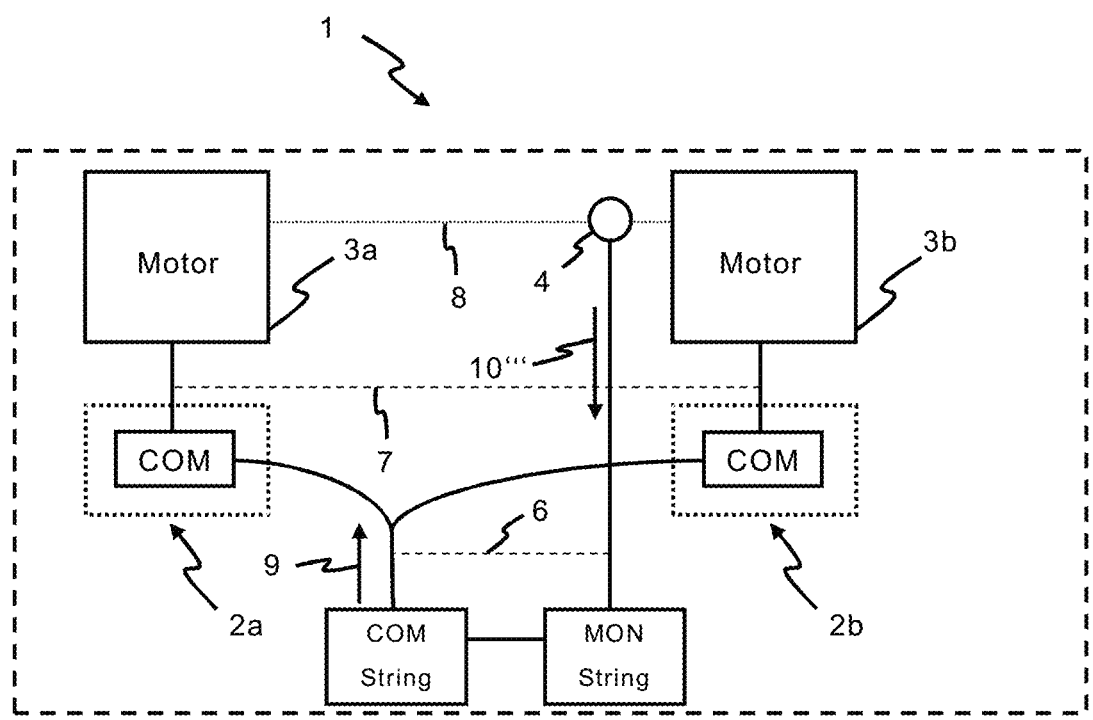
FIG. 1 schematically shows a motor control system.

FIG. 1 shows a motor control system 1 comprising one motor control unit 2a and another motor control unit 2b. Each of said motor control units 2a, 2b comprises a primary motor controller COM. The primary motor controllers COM are in communication with a system controller or control unit COMstring. The motor control system 1 further comprises a plurality of motors 3a, 3b. The one motor control unit 2a is allocated to one corresponding motor 3a, whereas the other motor control units 2b is allocated to another corresponding motor 3b. The motor control system 1 additionally comprises a sensor 4 which is connected to a controller-based system monitoring unit MONstring. The system monitoring unit MONstring is further connected to the system control unit COMstring and to a display unit 5.

The system monitoring unit MONstring is devised to disable communication between the system control unit COMstring and the primary motor controllers COM as indicated by dashed line 6. Additionally, the system monitoring unit MON-string is also devised to disable communication between the primary motor controllers COM and the corresponding motors 3a, 3b as indicated by dashed line 7. The sensor 4 determines an operation state of said corresponding motors 3a, 3b as indicated by dotted line 8, e.g. an operation temperature, noise level, rotation speed or the like.

During normal operation mode, motor control commands 9 are transmitted from the primary motor controllers COM to the corresponding motors 3a, b. In case the sensor 4 detects a malfunction of at least one of the corresponding motors 3a, 3b, a malfunction signal 10''' is generated and transmitted to the system monitoring unit MONstring. Subsequently, the system monitoring unit MONstring disables the communication between the system control unit COMstring and the primary motor controllers COM. Additionally or alternatively, the system monitoring unit MON-string disables the communication between the primary motor controllers COM and the corresponding motors 3a, 3b.

Figure 2:
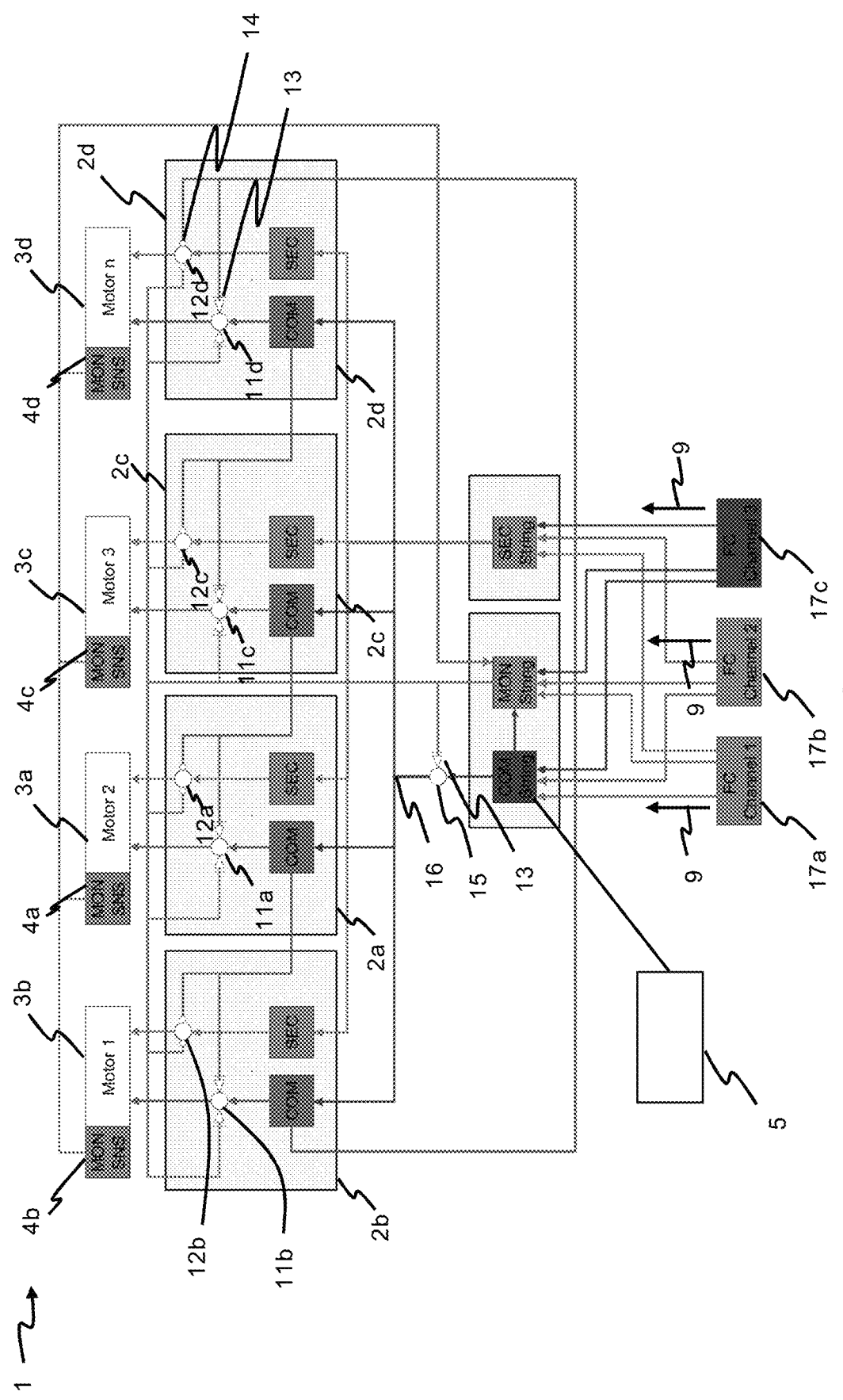
FIG. 2 schematically shows a motor control system comprising a plurality of motor control units and a plurality of motors.

FIG. 2 shows a motor control system 1 with a plurality of motor control units 2a-d and a plurality of corresponding motors 3a-d. Each motor control unit 2a-d comprises a secondary motor controller SEC which is connected to a motor 3a-d corresponding to a given motor control unit 2a-d. Each motor control unit 2a-d further comprises a primary switch 11a-d arranged between each primary motor controller COM and the corresponding motor 3a-d. Additionally, each motor control unit 2a comprises a secondary switch 12a-d arranged between each secondary motor controller SEC and the corresponding motor 3a-d. The primary motor controller COM of one motor control unit 2a is connected to the primary switch 11b via an inhibitor 13 as indicated by an arrow-symbol marked with reference numeral 13 (as shown in motor control unit 2d) and the secondary switch 12b of another motor control unit 2b via an enabler 14 as indicated by a dot-symbol marked with reference numeral 14 (as shown in motor control unit 2d). This interconnection concept applies for each motor control unit 2a-d, as can be retrieved from FIG. 2, thus resulting in a cyclical connection of the motor control units 2a-d. The motor control system 1 further comprises a secondary system control unit SECstring connected to each of said secondary motor controllers SEC. Additionally, the motor control system in FIG. 2 comprises a control switch 15 located between the system control unit COMstring and a junction 16, which connects the system control unit COMstring to each primary motor controller COM. The control switch 15 is further connected to the system monitoring unit MONstring via an inhibitor 13. A plurality of sensors 4a-d are comprised, and each sensors 4a-d is assigned to a corresponding motor 3a-d. Moreover, the motor control system 1 comprises a plurality of flight channels 17a-c, each being connected to the system control unit COMstring, the system monitoring unit MON-string and the secondary system control unit SECstring for providing motor control commands 9.

During operation of the motor control system 1 the primary switches 11*a*-*d* and the control switch 15 are in an initially closed switching state, which enables the motor control commands 9 generated by the flight control channels 17*a*-*c* to be transmitted from the system control unit COMstring through control switch 15 and junction 16 to each primary motor controller COM and further through the primary switches 11*a*-*d* to each corresponding motor 3*a*-*d*. The motor control commands 9 sent by the flight control channels 17*a*-16*c* are also transmitted through the secondary system control unit SECstring to each secondary motor controller SEC. However, the secondary switches 12*a*-*d* are in an initially open switching state that prohibits transmission of the motor control commands 9 from the secondary motor controller SEC to each corresponding motor 3*a*-*d*. Each one of the primary motor controllers COM and the secondary motor controllers SEC processes the received motor control commands 9 and extract a command string from said motor control commands 9, which contains relevant information for the one particular primary motor controller COM or secondary motor controller SEC for controlling said corresponding motor 3*a*-*d*.

In the following examples in FIGS. 3-14, different malfunction scenarios will be described, demonstrating the operational safety of the above-described motor control system.

Figure 3:
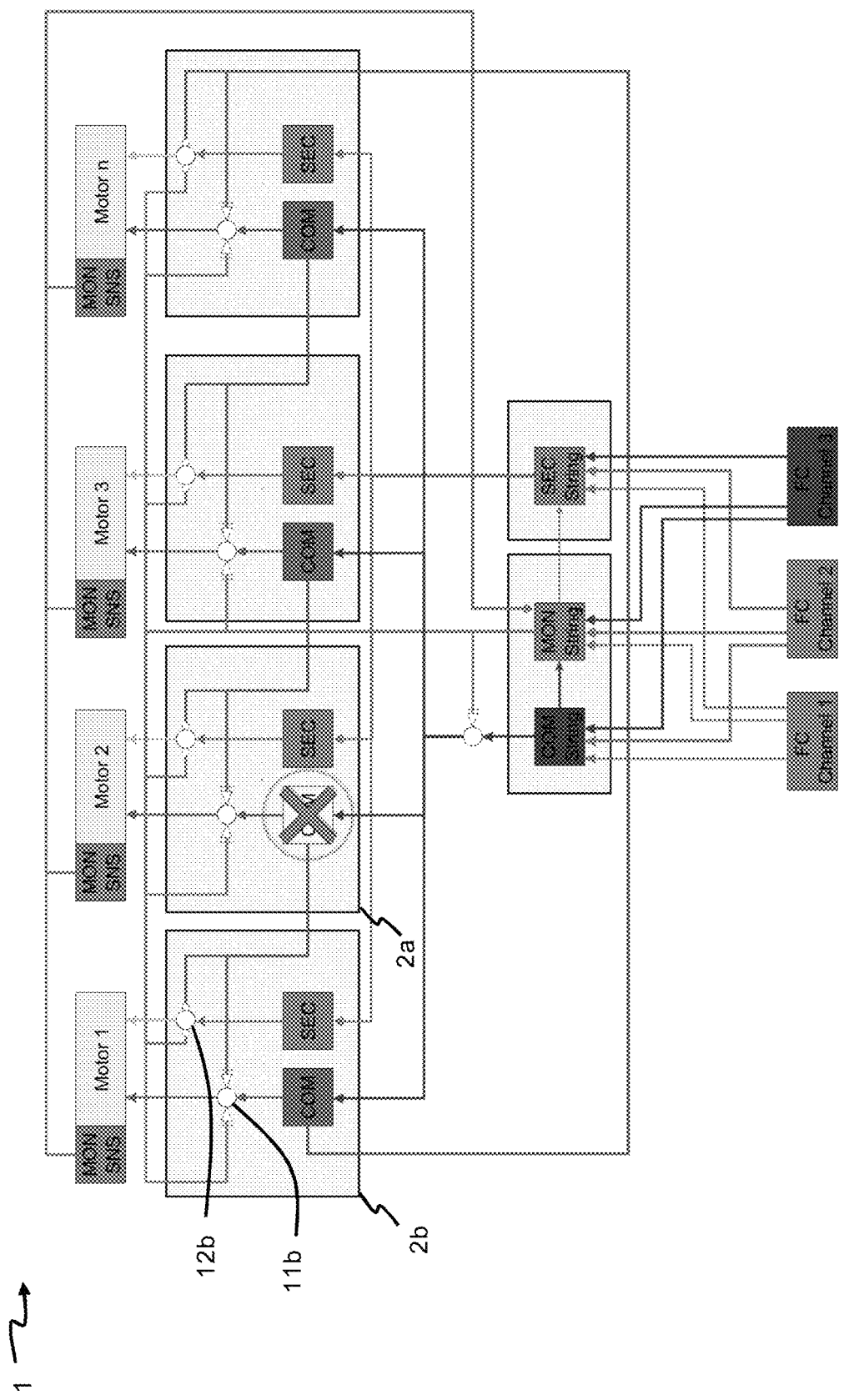
FIG. 3 shows the motor control system from FIG. 2, wherein one primary motor control unit malfunctions.

In FIG. 3 the primary motor controller COM of one motor control unit 2*a* is in a malfunctioning or erroneous state, for instance caused by a hardware malfunction or a software malfunction.

Figure 4:
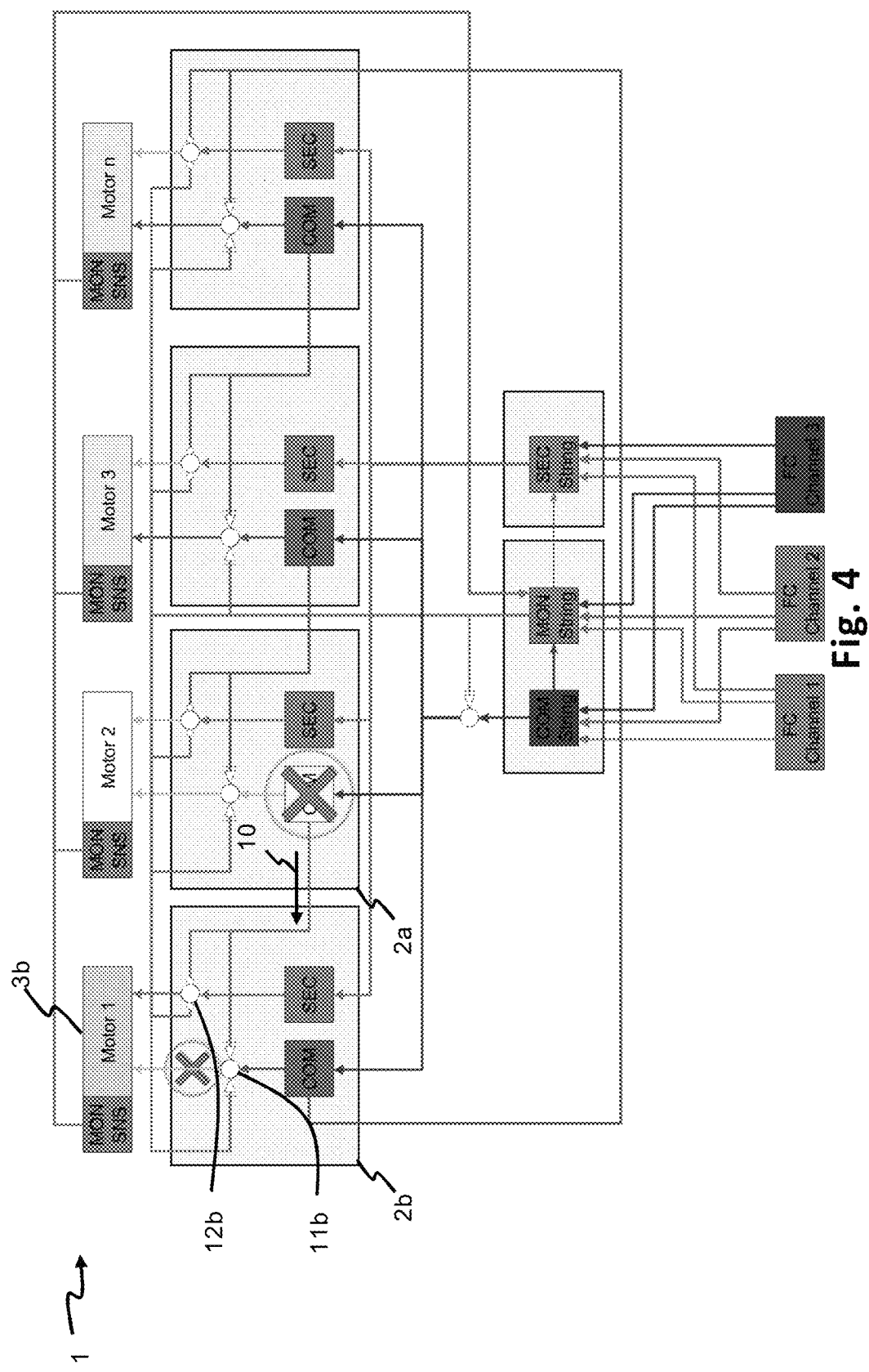
FIGS. 4 to 5 schematically illustrate effects of the malfunction shown in FIG. 3.

In FIG. 4 the effects of a malfunctioning primary motor controller COM as shown in FIG. 3 are illustrated. The malfunctioning primary motor controller COM of the one motor control unit 2*a* generates a malfunction signal 10 and transmits this malfunction signal 10 to the primary switch 11*b* and the secondary switch 12*b* of another (adjacent) motor control unit 2*b*, thereby changing their switching states.

This means that the switching state of the primary switch 11*b* is turned from an initially closed state into an open state, which open state prohibits the transmission of the motor control commands 9 from the primary motor controller COM to the corresponding motor 3*b*. Simultaneously, the initially open switching state of the secondary switch 12*b* is changed to a closed state, thus enabling the transmission of the motor control commands 9 from the secondary motor controller SEC to the corresponding motor 3*b*.

Figure 5:
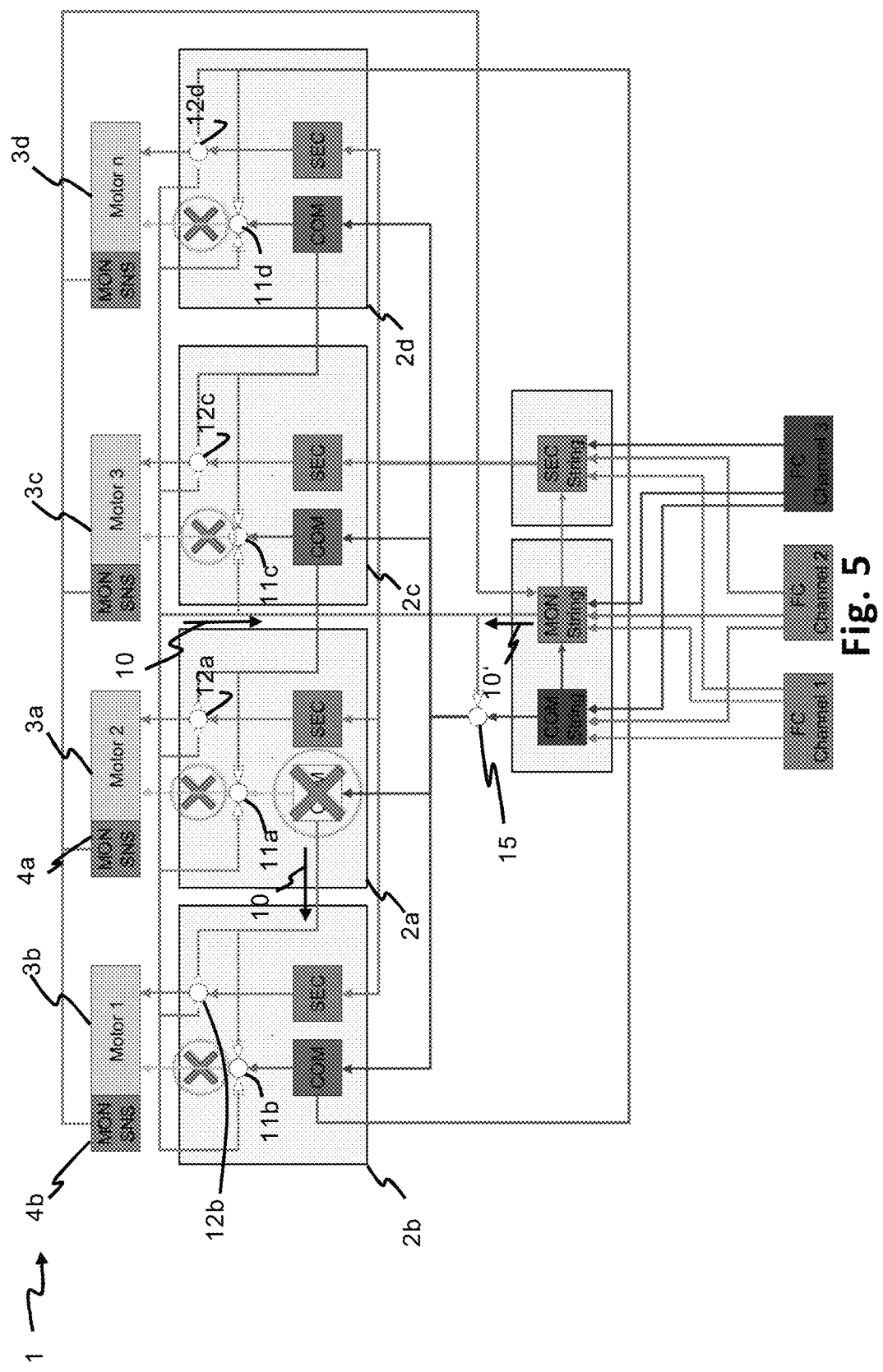

As shown in FIG. 5, sensor 4*a* redundantly detects said malfunction of the primary motor controller COM of motor control unit 2*a* and communicates this malfunction signal 10 to the system monitoring unit MONstring which subsequently generates another malfunction signal 10' and changes the switching states of the primary switches 11*a*-*d* and the secondary switches 12*a*-*d* (the switching states of 11*b* and 12*b* are only changed, if they have not already been changed previously) in the motor control units 2*a*-2*d* accordingly. Redundantly, the malfunction signal 10 generated by the malfunctioning primary motor controller COM in motor control unit 2*a* is also transmitted through the primary switch 11*b* to the primary switches 11*a*, 11*c* and 11*d* as well as to the secondary switches 12*a*, 12*c* and 12*d*. In case the switching states of the primary switches 11*a*-*d* have not been changed to a closed state by the system monitoring unit MONstring, the afore-described malfunction signal 10 will change the switching state to a closed state. In case the secondary switches 12*a*-*d* are not yet in a closed state, the malfunction signal 10 will change the switching state of the primary switches 11*a*-*d* accordingly. Furthermore, the other malfunction signal 10' of the system monitoring unit 1 changes the switching state of the control switch 15 from an initially closed state to an open state, ensuring that no motor control commands 9 are transmitted from the system control unit COMstring to the primary motor controllers COM. This redundancy provides additional safety in case one of the primary switches 11*a*-*d* malfunctions.

Figure 6:
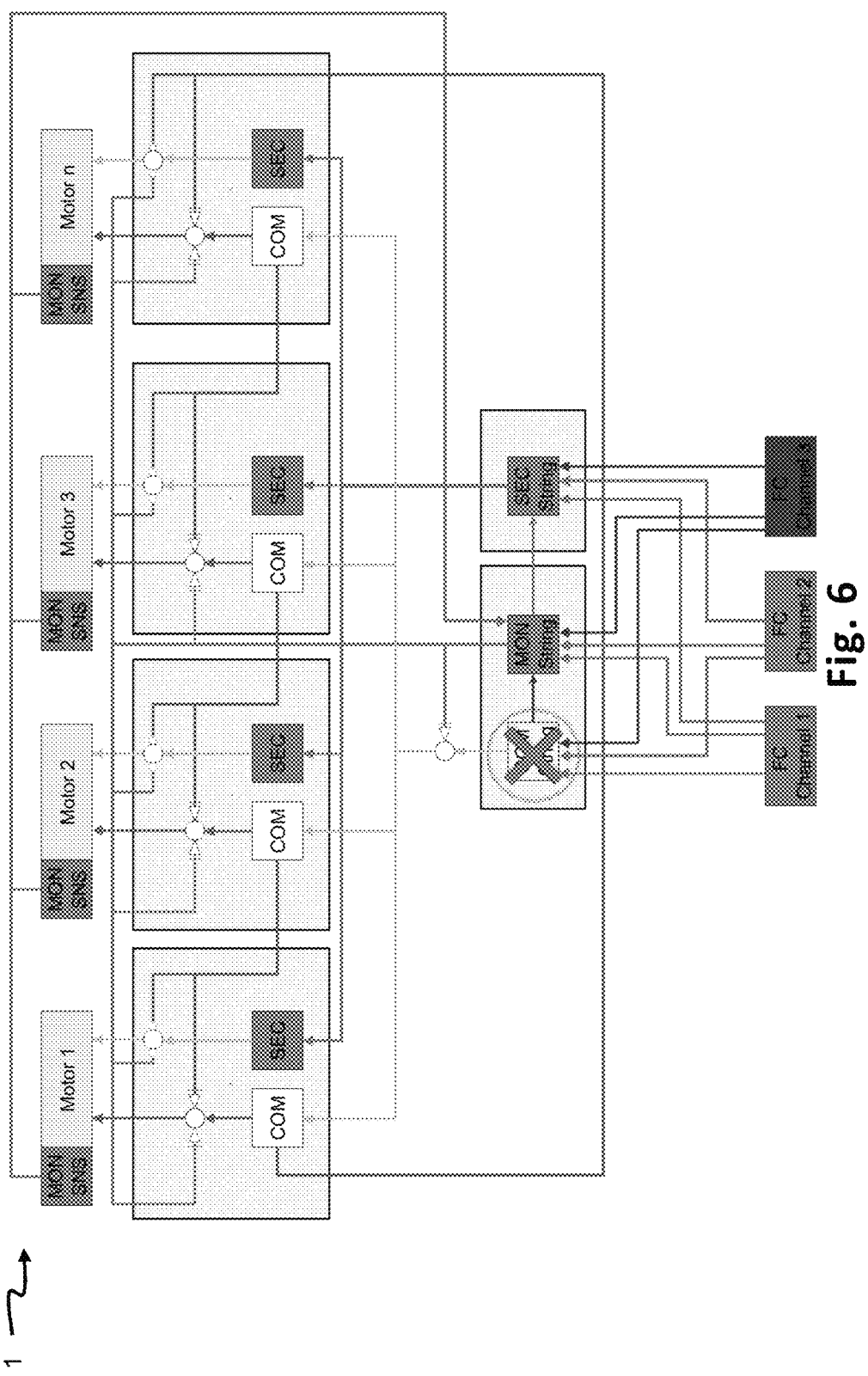
FIGS. 6 and 7 schematically show effects of a malfunction of a system control unit.
Figure 7:
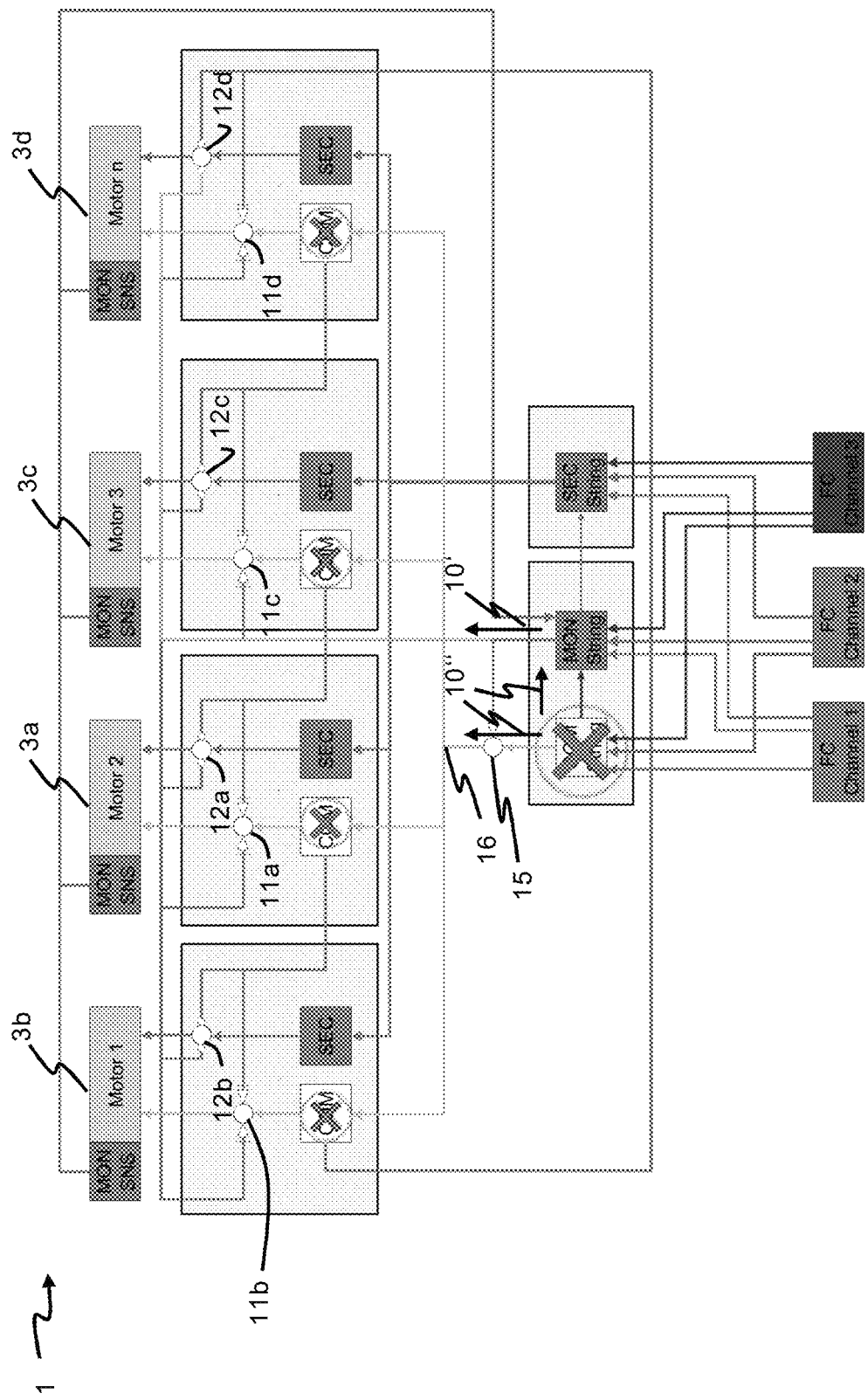

In FIG. 6 the system control unit COMstring is malfunctioning and generates a malfunction signal 10" (shown in FIG. 7). The malfunction can be caused by a hardware and/or by a software malfunction or error, as previously described for the malfunction of a primary motor controller COM.

As can be seen in FIG. 7, this malfunction signal 10" is propagated through control switch 15 and junction 16 to the primary motor controllers COM. After receiving the malfunction signal 10", the primary motor controllers COM terminate their function and communicate the malfunction signal 10" to the primary switches 11*a*-*d* and to the secondary switches 12*a*-*d*, changing their switching states as previously described.

Simultaneously, the system monitoring unit MONstring monitors the operation of the primary motor controllers COM, receives the malfunction signal 10", and redundantly generates a malfunction signal 10', which subsequently changes the switching states of the primary switches 11*a*-*d*, the secondary switches 12*a*-*d* and the control switch 15, in case their switching state have not been changed already. After changing the switching states of the primary switches 11*a*-*d* and the secondary switches 12*a*-*d*, the motor control commands 9 are transmitted via the secondary motor controllers SEC to the corresponding motors 3*a*-*d*.

Figure 8:
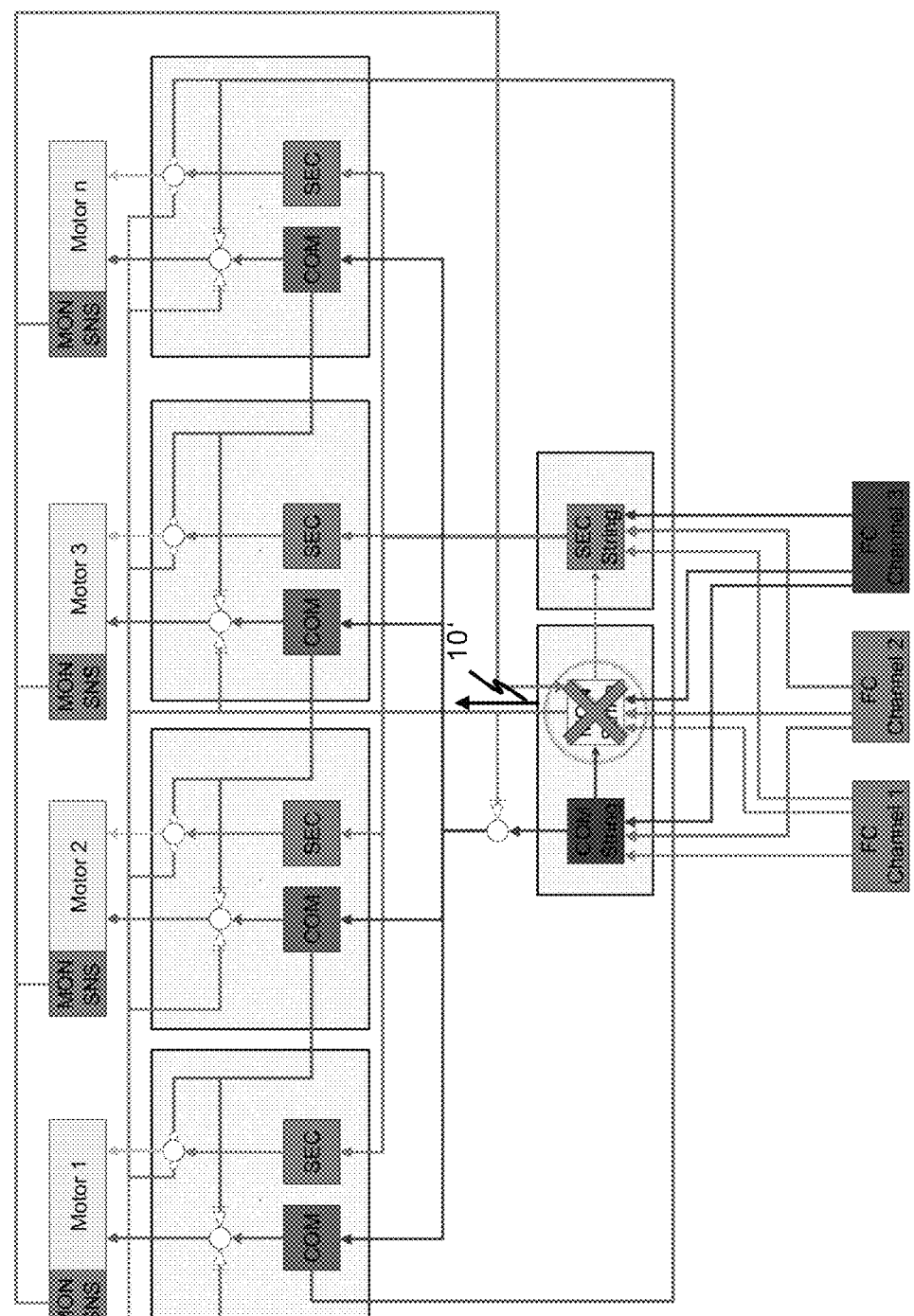
FIGS. 8 and 9 schematically illustrate a malfunctioning system monitoring unit.

In FIG. 8 a malfunction of the system monitoring unit MONstring is shown. The system monitoring unit MONstring generates a corresponding malfunction signal 10'. The system monitoring unit MONstring can determine its malfunction, for example by comparing the motor control commands 9 provided by the flight control channels 17*a*-*c* to the motor control commands 9 provided by the system control unit COMstring.

Figure 9:
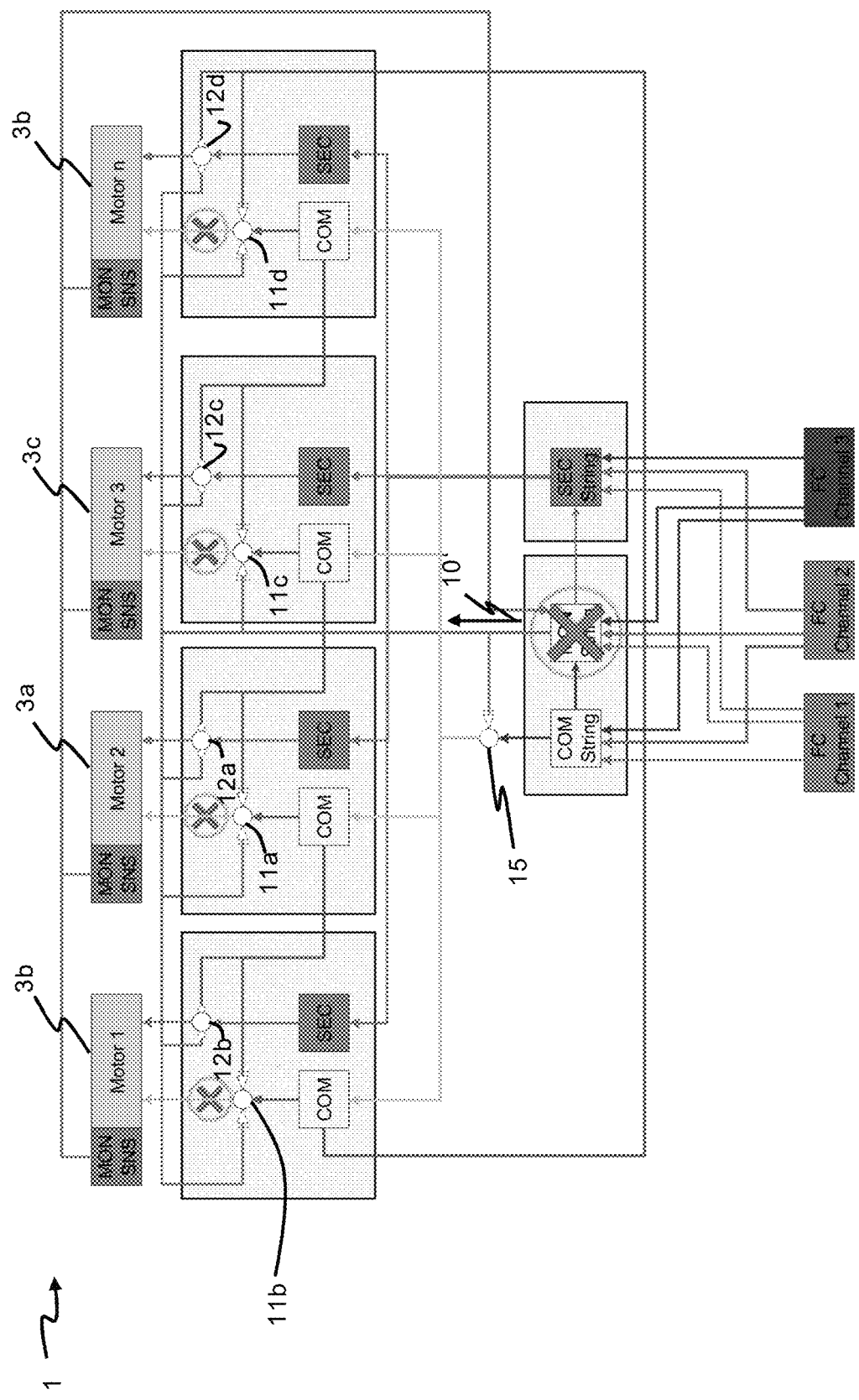

As can be seen in FIG. 9, the malfunction signal 10' generated by the system monitoring unit MONstring changes the switching state of the primary switches 11*a*-*d*, the secondary switches 12*a*-*d* and the control switch 15 as previously described, causing the motor control commands 9 to be transmitted from the flight control channels 17*a*-*c* to the corresponding motors 3*a*-*d* via the secondary motor controller SEC. In consequence, a failure of the system monitoring unit MON-string also disables the transmission of the motor control commands 9 from the primary motor controllers COM to the corresponding motors 3*a*-*d*.

Figure 10:
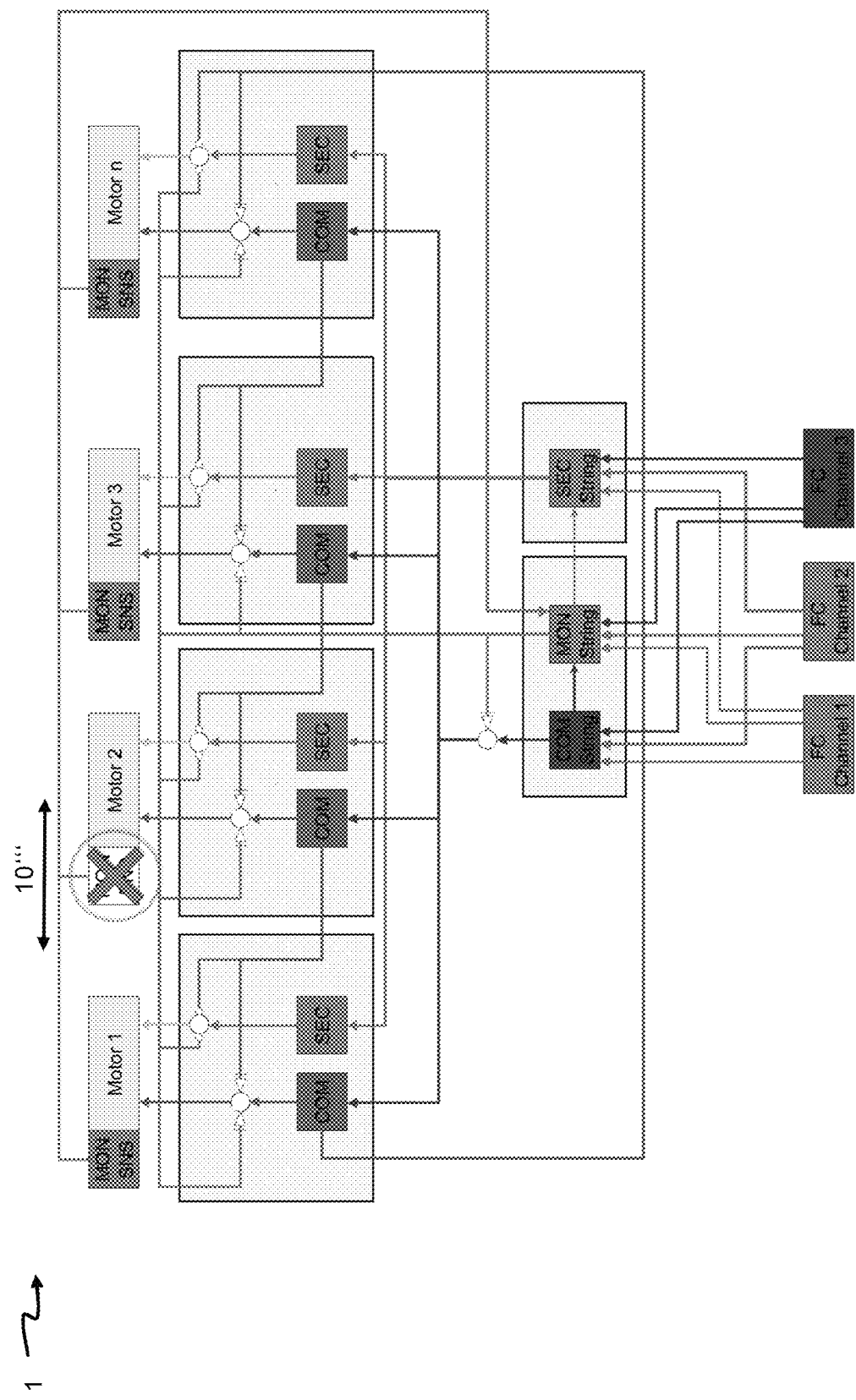
FIGS. 10 to 12 schematically show a malfunction of a sensor.
Figure 11:
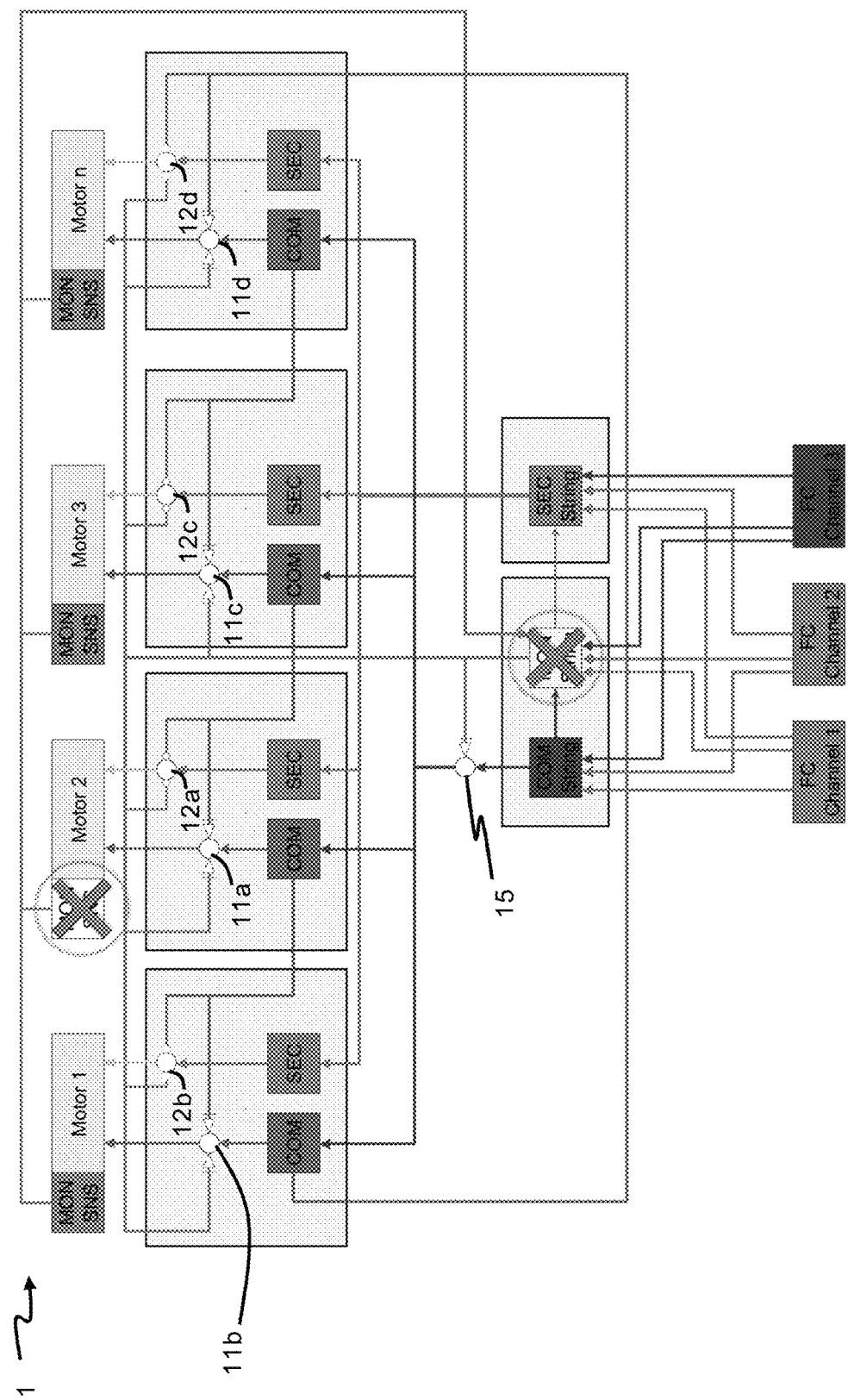
Figure 12:
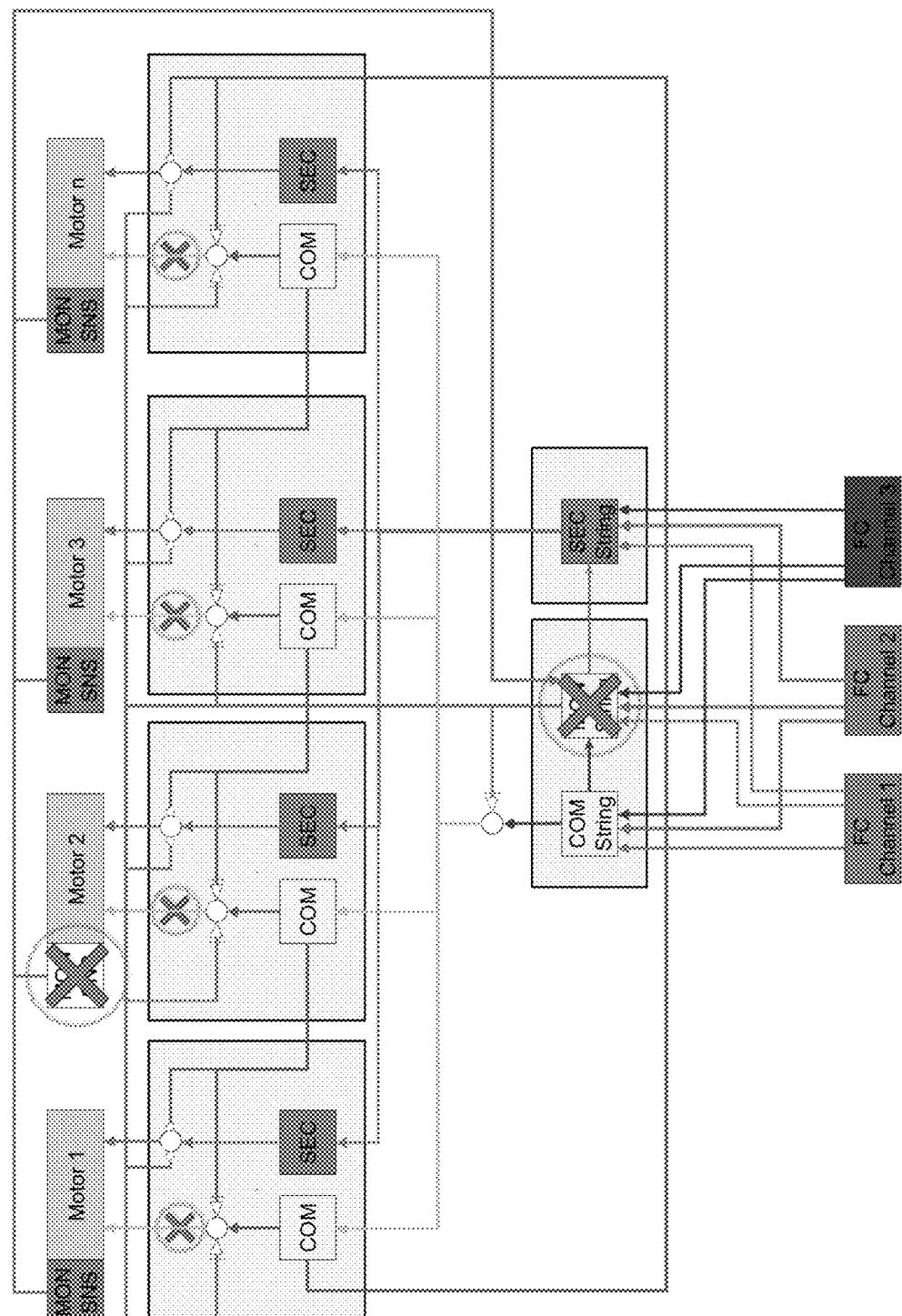

In FIG. 10 a malfunction of a sensor is exemplarily shown for the failure of sensor 4*a*. A malfunction signal 10''' is generated and communicated to the system monitoring unit MONstring as can be seen in FIG. 11. As already previously described, the system monitoring unit MONstring subsequently changes the switching states of the primary switches 11*a*-*d*, the secondary switches 12*a*-*d* and the control switch 15. As a result of this change in switching states, the motor control commands 9 are transmitted from the secondary motor controllers SEC to the corresponding motors 3*a*-*d*, as can be seen in FIG. 12 (and as previously described).

Figure 13:
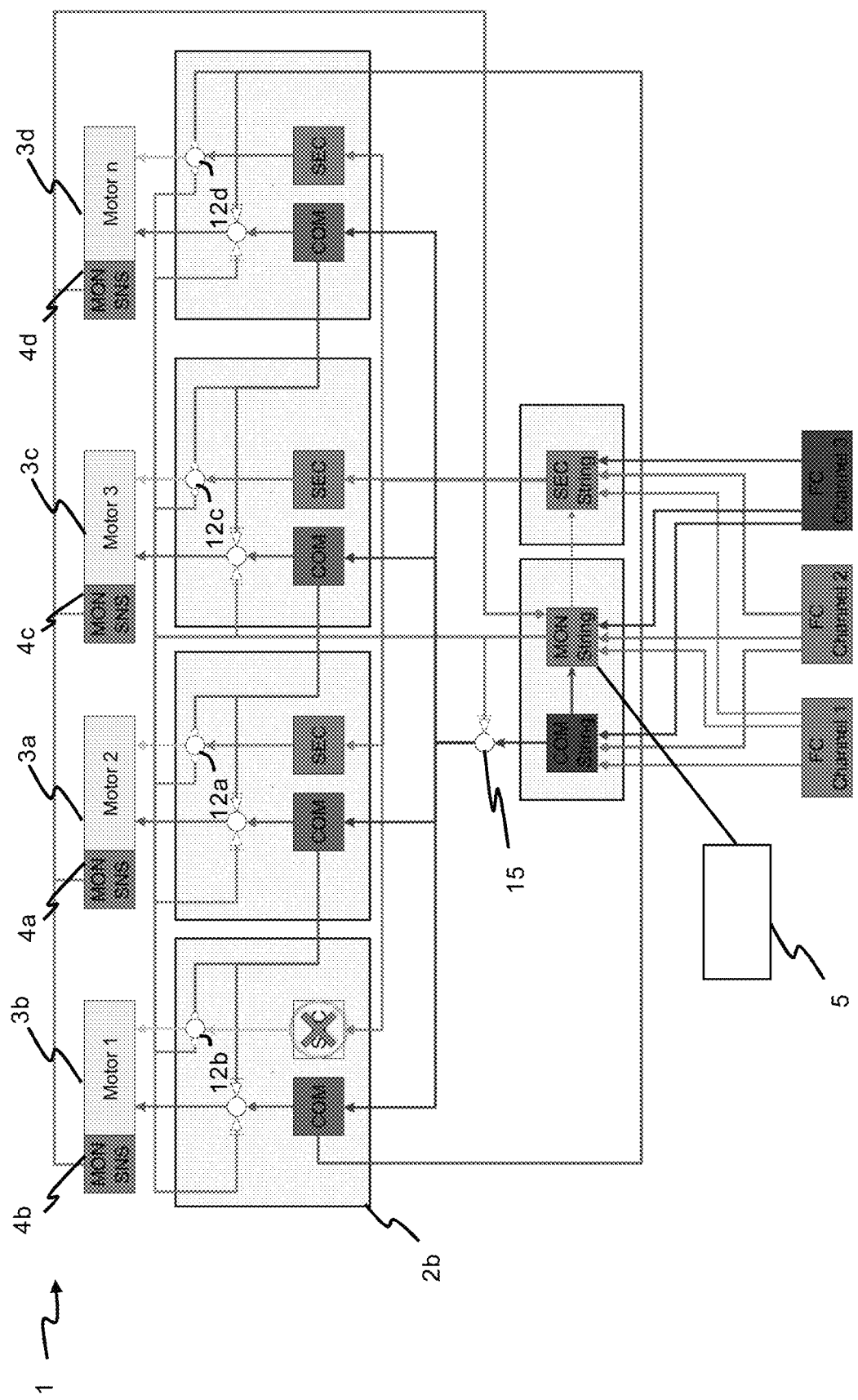
FIG. 13 schematically shows a malfunctioning secondary motor controller.

In FIG. 13 a malfunction of a secondary motor controller SEC is illustrated. During the normal operation mode, wherein the motor control commands 9 are transmitted from the primary motor controllers COM to the corresponding motors 3a-d, a failure of a secondary motor controller SEC cannot be recognized by the motor control system 1. Therefore, proper functioning of the secondary motor controllers SEC is preferably evaluated in a so-called power-up built-in test which is preferably performed during start-up of the motor control system 1. During the power-up built-in test, the motor control commands 9 are transmitted via the secondary motor controller SEC to the corresponding motors 3a-d, and not via the primary motor controllers COM, as in the normal operation mode, by changing the switching states of the secondary switches 12a-d and the control switch 15. In case of a malfunction of at least one secondary motor controller SEC, the system monitoring unit MON-string recognizes the malfunction and communicates this information to an aircraft health management system, e.g. a display unit 5 (without limitation). Redundantly or alternatively, sensors 4a-d can observe and report said malfunction to the system monitoring unit MONstring.

Figure 14:
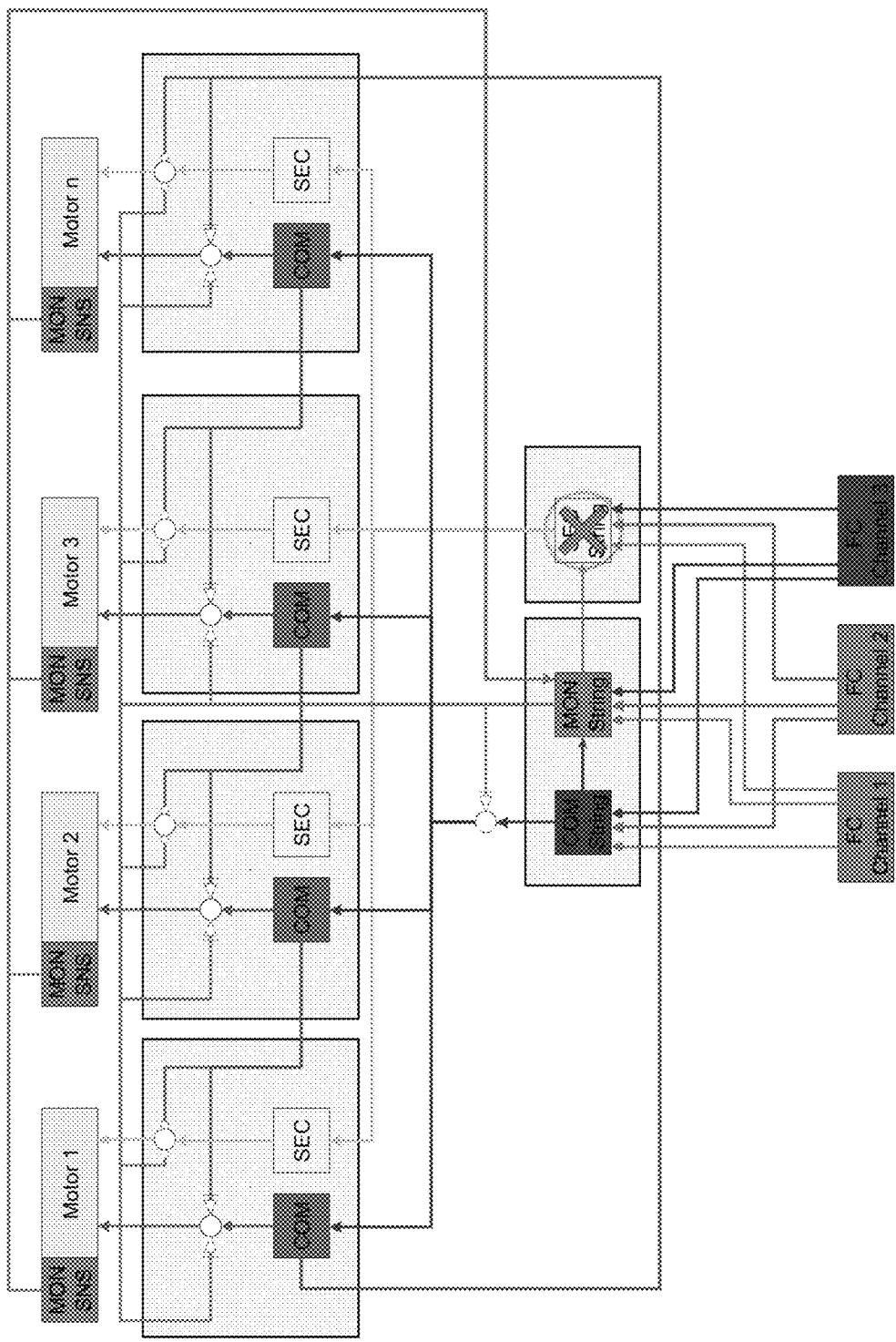
FIG. 14 schematically shows a malfunction of a secondary system control unit.

In FIG. 14 a failure of the system control unit SECstring is illustrated. As already previously described for a failure of the secondary motor controller SEC in connection with FIG. 13, failure of the secondary system control unit SECstring cannot be recognized during the normal operation mode. However, a malfunction of the secondary system control unit SECstring can also be recognized during the aforedescribed power-up built-in test.

Figure 15:
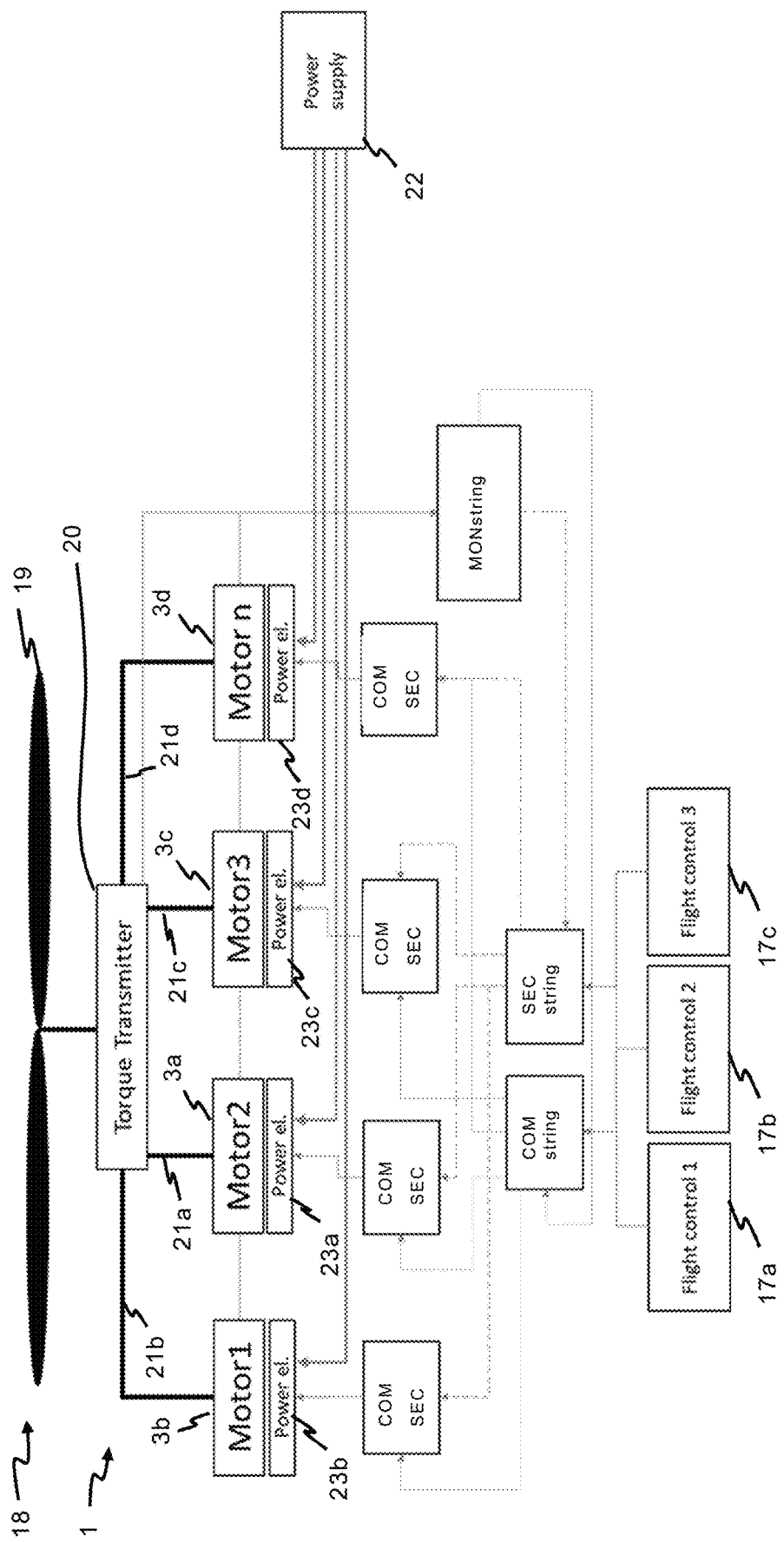
FIG. 15 shows an aircraft comprising a motor control system.

FIG. 15 shows an aircraft 18 comprising a motor control system 1 and a lift generating unit 19, particularly a rotor 19. In the example of FIG. 15, the primary motor controllers COM and the secondary motor controllers SEC are located in the same box.

The rotor 19 is mechanically connected to a torque transmitter 20. The aircraft 18 comprises a plurality of motors 3a-d which are mechanically connected to the torque transmitter 20 via clutches 21a-d, that can be opened on demand. Furthermore, the aircraft 18 comprises a power supply 22 connected to a plurality of power controllers 23 a-d. Each one of power controllers 23 a-d is assigned to one corresponding motor 3a-d, as can be seen in FIG. 15. Furthermore, each one of power controllers 23 a-d is connected to a corresponding primary motor controller COM.

During normal operation, the power supply 22 provides energy to the power controllers 23 a-d which transmit the energy to all motors 3a-d, which then provide torque to torque transmitter 20 thus causing rotation of the rotor 19.

In case of a malfunction of a particular motor 3a, said motor 3a can be disconnected from the torque transmitter 20 by opening the corresponding clutch 21a-d. In this case, the healthy motors 3b-d may each provide higher torque than during normal operation in order to not lose torsional moment of rotor 19 and to ensure airworthiness of the aircraft 18.

Figure 16A:
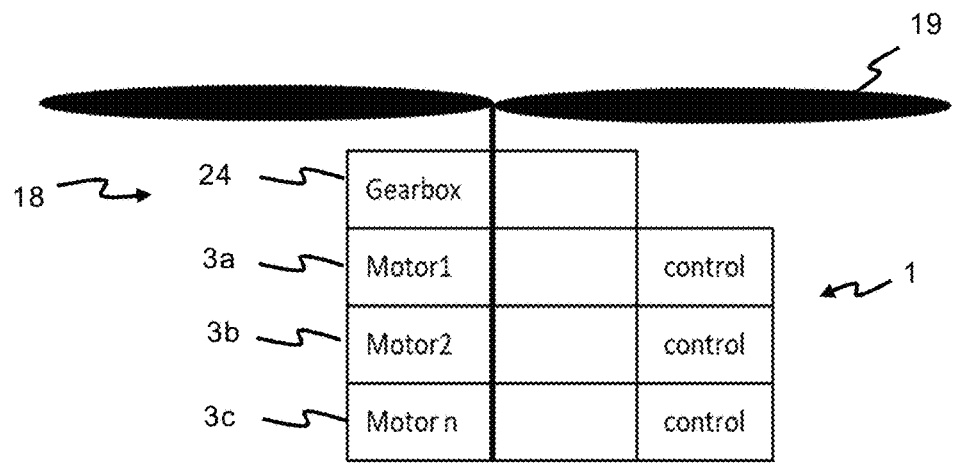
FIGS. 16A to 16C show a schematic arrangement of said plurality of motors relative to a lift generating unit.
Figure 16B:
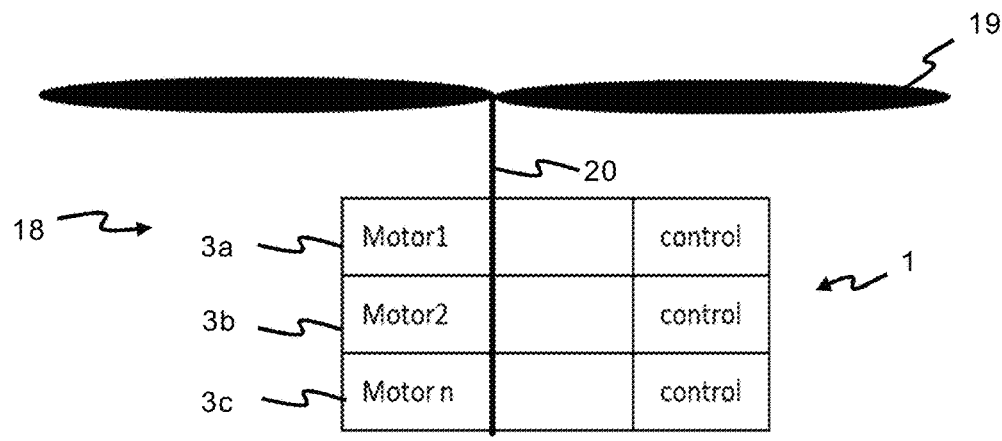
Figure 16C:
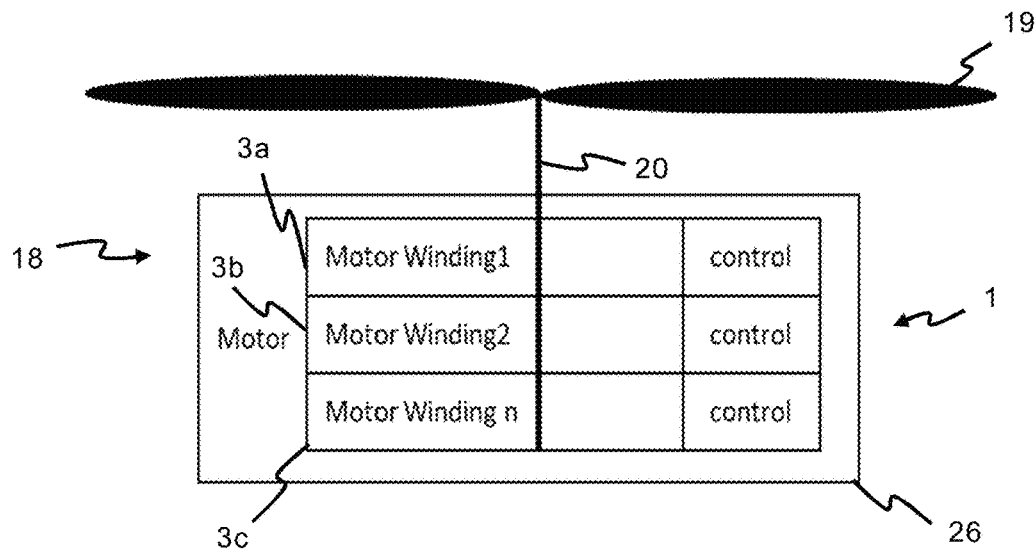

In FIGS. 16A-C different embodiments of motor-rotor connections are shown. In FIGS. 16A-16C, each motor 3a-c is connected to a motor control system 1 as described previously.

In FIG. 16A, a plurality of motors 3a-c are connected via a gearbox 24 to the rotor 19. Preferably, the gearbox 24 functions as torque transmitter 20.

In FIG. 16B, a plurality of motors 3a-c are directly connected to the rotor 19. A shaft 25 functions as torque transmitter 20.

In FIG. 16C, a plurality of motor windings 3a-c corresponding to a plurality of motors 3a-c are comprised in one overall motor system 26. The motor windings are connected via the shaft 25, which functions as torque transmitter 20, to the rotor 19.

Figure 17:
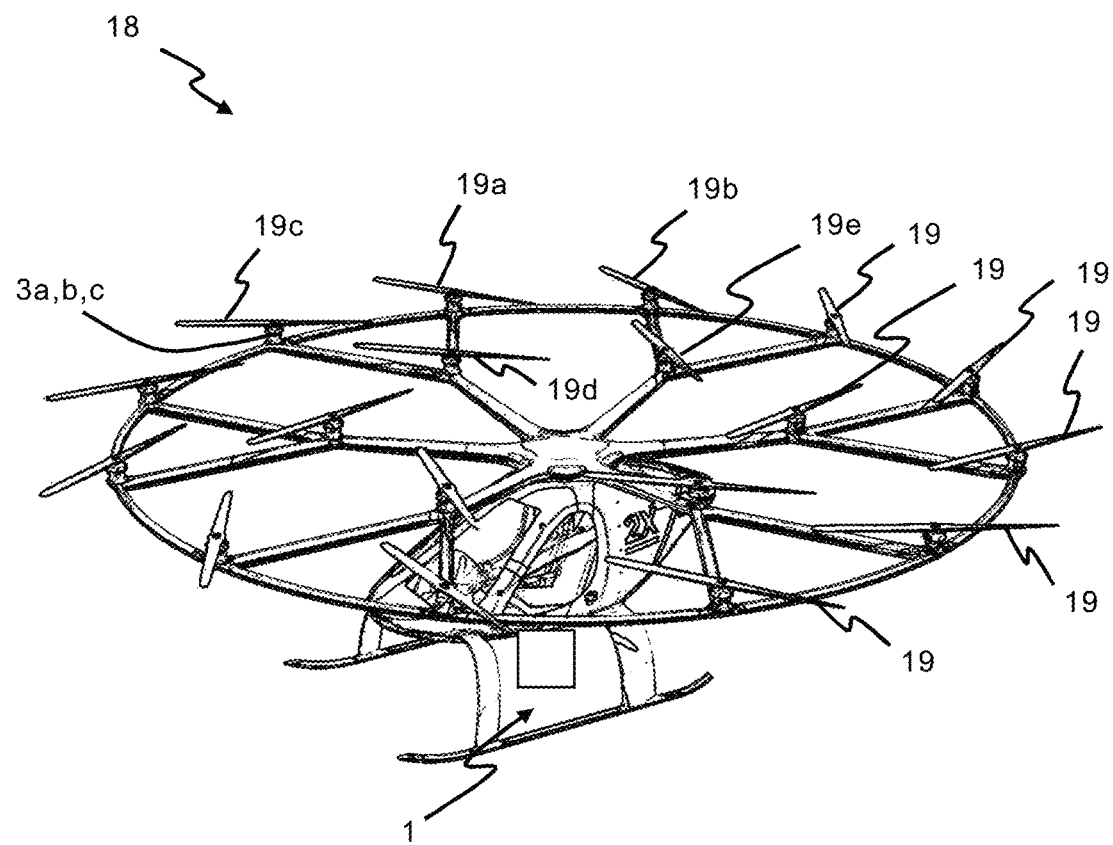
FIG. 17 shows an aircraft with a plurality of lift generating units.

In FIG. 17, an aircraft 18 with a plurality of rotors 19, 19a-e and a motor control system 1 is shown. Each rotor 19, 19a-e is connected to a plurality of motors 3a-c (exemplarily shown for rotor 19c). The plurality of motors 3a-c are connected to a motor control system 1 as previously described.

The aircraft 18 in FIG. 17 is particularly safe due to the fact that in case of a malfunction or failure of one rotor 19a, the rotors in close proximity 19b-e can compensate the lift generation loss caused by the malfunction of said rotor 19a, for example by accelerating a rotational speed of the rotors in close proximity 19b-e. This additional redundancy ensures airworthiness of the aircraft 18, even in severe cases of a rotor malfunction or failure.

LIST OF REFERENCE NUMERALS 1 motor control system
2 motor control unit
2a one motor control unit
2b-d another motor control unit
COM primary motor controller
COMstring system control unit
3 corresponding motor
3a one corresponding motor
3b-d another motor
4 sensor
4a-d sensors
MONstring system monitoring unit
5 display unit
6 dashed line
7 dashed line
8 dotted line
9 motor control commands
10, 10', 10", 10''' malfunction signal
SEC secondary motor controller
11a-d primary switch
12a-d secondary switch
13 inhibitor
14 enabler
SECstring secondary system control unit
15 control switch
16 junction
17a-c flight channel
18 aircraft
19 lift generating unit, rotor
19a-e lift generating unit, rotor
20 torque transmitter
21a-d coupling means, clutches
22 power supply
23 power controller
24 gearbox
25 shaft
26 overall motor system

The invention claimed is:

1. A motor control system (1) for an aircraft (18), the motor control system comprising:
  a plurality of motors (3), each of said motors having a motor control unit (2) for controlling a respective one of the motors (3), each of said motor control units (2)

comprising a primary motor controller (COM) configured to provide motor control commands (9) to said corresponding motor (3);
a system controller (COMstring) in communication connection with each of said plurality of primary motor controllers (COM), said system controller (COMstring) being configured to provide motor control commands (9) to said primary motor controllers (COM);
a system monitoring unit (MONstring) in connection with said system controller (COMstring) for monitoring an operation thereof;
at least one sensor (4) for determining an operation state of at least one of said plurality of motors (3), said sensor (4) in operative connection with said system monitoring unit (MONstring);
wherein said system monitoring unit (MONstring) is configured to disable communication at least one of between said system control unit (COMstring) and said primary motor controllers (COM) or between said primary motor controllers (COM) and said motors (3) based on at least one of an outcome of said monitoring or of said determining of the operation state;
wherein each of said motor control units (2) comprises a primary switch (11), said primary switch (11) being located between said primary motor controller (COM) and the corresponding motor (3); and said system monitoring unit (MONstring) is in connection with each of said primary switches (11) for controlling a switching state thereof.

2. The motor control system according to claim 1, wherein the primary motor controller (COM) of one said motor control unit (2a) is in connection with said primary switch (11) of another said motor control unit (2b) for controlling a switching state thereof.

3. An aircraft (18), comprising:
a motor control system (1) according to claim 1; and
at least one lift generating rotor (19, 19a-e) mechanically coupled to at least one of said motors (3).

4. The aircraft (18) of claim 3, further comprising:
a coupling (21) located between said motors (3) and said at least one lift generating rotor (19, 19a-e);
said motor control system (1) is in communication with said coupling (21); and
the coupling (21) is configured to connect or disconnect at least one of said motors (3) to or from said lift generating rotor (19), based on an outcome of at least one of said monitoring or said determining by said motor control system (1).

5. A motor control system (1) for an aircraft (18), the motor control system comprising:
a plurality of motors (3), each of said motors having a motor control unit (2) for controlling a respective one of the motors (3), each of said motor control units (2) comprising a primary motor controller (COM) configured to provide motor control commands (9) to said corresponding motor (3);
a system controller (COMstring) in communication connection with each of said plurality of primary motor controllers (COM), said system controller (COMstring) being configured to provide motor control commands (9) to said primary motor controllers (COM);
a system monitoring unit (MONstring) in connection with said system controller (COMstring) for monitoring an operation thereof;
at least one sensor (4) for determining an operation state of at least one of said plurality of motors (3), said sensor (4) in operative connection with said system monitoring unit (MONstring);
wherein said system monitoring unit (MONstring) is configured to disable communication at least one of between said system control unit (COMstring) and said primary motor controllers (COM) or between said primary motor controllers (COM) and said motors (3) based on at least one of an outcome of said monitoring or of said determining of the operation state; and
each of said motor control units (2) comprises a secondary motor controller (SEC) configured to provide motor control commands (9) to a corresponding one of said motors (3); a secondary switch (12) located between each said secondary motor controller (SEC) and the corresponding motor (3); and said system monitoring unit (MONstring) is in connection with each of said secondary switches (12) for controlling a switching state thereof.

6. The motor control system according to claim 5, wherein said primary switch (11) is initially in a closed switching state and said secondary switch (12) is initially in an open switching state; and said system monitoring unit (MONstring) is configured to enable communication between said secondary motor controllers (SEC) and said motors (3) based on an outcome of at least one of said monitoring or said determining of the operation state.

7. The motor control system according to claim 5, wherein the primary motor controller (COM) of one motor control unit (2a) is in connection with said secondary switch (12) of another motor control unit (2b) for controlling a switching state thereof.

8. The motor control system according to claim 5, further comprising a secondary system control unit (SECstring) in communication connection with each of said plurality of secondary motor controllers (SEC), said secondary system control unit (SECstring) being configured to provide motor control commands (9) to said secondary motor controllers (SEC); and said system monitoring unit (MONstring) is in connection with said secondary system control unit (SECstring) for monitoring an operation thereof.

9. The motor control system according to claim 8, further comprising at least one flight control channel (17) in connection with and for providing motor control commands (9) to said system control unit (COMstring), said system monitoring unit (MONstring) and said secondary system control unit (SECstring).

10. The motor control system according to claim 8, wherein said system control unit (COMstring) comprises a first set of at least one of hardware or software and said secondary system control unit (SECstring) comprises a second set of at least one of hardware or software, and the system control unit (COMstring) and the secondary system control unit (SECstring) are managed by different operating systems.

11. The motor control system according to claim 5, wherein said primary motor controllers (COM) comprise a first set of at least one of hardware or software and said secondary motor controllers (SEC) comprise a second set of at least one of hardware software, and the primary motor controllers (COM) and the secondary motor controllers (SEC) are managed by different operating systems.

12. A method of operating a motor control system, comprising the steps of:
providing a primary motor controller (COM), a secondary motor controller (SEC), a system controller (COMstring), and a corresponding motor (3);

generating, by the system controller (COMstring), a motor control command (9);

transmitting, by the system controller (COMstring), said motor control command (9) to said primary motor controller (COM);

transmitting said motor control command (9) from said primary motor controller (COM) to said corresponding motor (3);

at least one of determining an operation state of said corresponding motor (3) or monitoring an operation state of said primary motor controller (COM);

disabling transmitting of said motor control command (9) from said primary motor controller (COM) to said corresponding motor (3) and enabling transmitting of said motor control command (9) to said secondary motor controller (SEC) and from said secondary motor controller (SEC) to said corresponding motor (3) based on at least one of said determining or said monitoring, wherein said secondary motor controller (SEC) includes a parallel command structure to the primary motor controller (COM) and each of said secondary motor controller (SEC) and said primary motor controller (COM) receive said motor control commands (9) and separately and selectively process said received motor control commands (9) to extract a command string from said motor control commands (9) for transmitting to and controlling the corresponding motor (3).

13. The method according to claim 12, further comprising:

providing a system monitoring unit (MONstring);

disabling transmission of said motor control command (9) from said primary motor controller (COM) to said corresponding motor (3) via said system monitoring unit (MONstring) based on at least one of said determining or monitoring; and enabling transmission of said motor control command (9) from said secondary motor controller (SEC) to said corresponding motor (3) via said system monitoring unit (MONstring) based on at least one of said determining or said monitoring.

14. The method according to claim 13, further comprising:

providing at least one sensor (4);

determining said operation state via said sensor (4), and communicating said determining to said monitoring unit (MONstring); and monitoring said operation state via said monitoring unit (MONstring).

15. An aircraft comprising a motor control system configured to carry out the method according to claim 12.

16. A method of operating an aircraft, comprising:

providing a motor control system (1); and operating said motor control system according to the method of claim 12.

17. A method of operating a motor control system, comprising the steps of:

providing a primary motor controller (COM), a secondary motor controller (SEC) and a corresponding motor (3);

generating a motor control command;

transmitting said motor control command (9) from said primary motor controller (COM) to said corresponding motor (3);

at least one of determining an operation state of said corresponding motor (3) or monitoring an operation state of said primary motor controller (COM);

disabling transmitting of said motor control command (9) from said primary motor controller (COM) to said corresponding motor (3) and enabling transmitting of said motor control command (9) from said secondary motor controller (SEC) to said corresponding motor (3) based on at least one of said determining or said monitoring:

providing one motor control unit (2a) comprising said primary motor controller (COM);

providing another motor (3b) with another motor control unit (2b) corresponding to another primary motor controller (COM) and another secondary motor controller (SEC) of said another motor control unit (2b);

disabling transmission of said motor control command (9) from said another primary motor controller (COM) of said another motor control unit (2b) to said another motor (3b) via said primary motor controller (COM) of said one motor control unit (2a) based on at least one of said determining or said monitoring;

enabling transmission of said motor control command (9) from said another secondary motor controller (SEC) of said another motor control unit (2b) to said another motor (3b) via said primary motor controller (COM) of said one motor control unit (2a) based on at least one of said determining or said monitoring.

* * * * *